(12) United States Patent
Tominaga et al.

(10) Patent No.: US 10,345,534 B2
(45) Date of Patent: Jul. 9, 2019

(54) PIGTAIL-TYPE OPTICAL RECEPTACLE

(71) Applicant: TOTO LTD., Kitakyushu-Shi, Fukuoka (JP)

(72) Inventors: Kohei Tominaga, Kitakyushu (JP);
Satoshi Kaneyuki, Kitakyushu (JP);
Sho Kondo, Kitakyushu (JP);
Hirotsugu Agatsuma, Kitakyushu (JP);
Satoshi Hakozaki, Kitakyushu (JP);
Hiroki Sato, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 16/029,172

(22) Filed: Jul. 6, 2018

(65) Prior Publication Data

US 2018/0314019 A1    Nov. 1, 2018

Related U.S. Application Data

(63) Continuation of application No. PCT/JP2017/018866, filed on May 19, 2017.

(30) Foreign Application Priority Data

May 20, 2016  (JP) .................................. 2016-101550
Feb. 3, 2017  (JP) .................................. 2017-018454
(Continued)

(51) Int. Cl.
*G02B 6/38*  (2006.01)
*G02B 6/42*  (2006.01)

(52) U.S. Cl.
CPC ......... *G02B 6/3869* (2013.01); *G02B 6/3837* (2013.01); *G02B 6/3874* (2013.01);
(Continued)

(58) Field of Classification Search
None
See application file for complete search history.

(56) References Cited

U.S. PATENT DOCUMENTS

| 5,772,720 A * | 6/1998 | Taira-Griffin | ........... C03B 37/15 |
| | | | 264/1.26 |
| 2010/0104244 A1* | 4/2010 | Grinderslev | ............. G02B 6/32 |
| | | | 385/74 |

(Continued)

FOREIGN PATENT DOCUMENTS

| JP | S61-76405 U | 5/1986 |
| JP | 10-332988 A | 12/1998 |

(Continued)

*Primary Examiner* — Michael Stahl
(74) *Attorney, Agent, or Firm* — Carrier Blackman & Associates, P.C.; Joseph P. Carrier; Anne G. Sabourin

(57) ABSTRACT

A pigtail-type optical receptacle includes a ferrule, an optical fiber, a protective member, a sleeve, and a holder. The ferrule has a through-hole extending in an axial direction. The optical fiber is held by the ferrule in a state of being inserted into the through-hole and extends outside the ferrule from a rear end side of the ferrule. The protective member covers a portion of the optical fiber extending outside the ferrule. The sleeve engages an outer surface of the ferrule. The through-hole includes a first region and a second region. The second region is disposed rearward of the first region. The width in an orthogonal direction orthogonal to the axial direction of the through-hole in the second region widens toward the rear end side of the ferrule. The holder holds a portion of the outer surface of the ferrule rearward of the first region.

14 Claims, 13 Drawing Sheets

(30) Foreign Application Priority Data

May 19, 2017 (JP) .................................. 2017-099521
May 19, 2017 (JP) .................................. 2017-099522

(52) U.S. Cl.
CPC .......... *G02B 6/4262* (2013.01); *G02B 6/4285* (2013.01); *G02B 6/4292* (2013.01)

(56) References Cited

U.S. PATENT DOCUMENTS

2016/0349463 A1* 12/2016 Akashi .................. G02B 6/4285
2017/0315307 A1* 11/2017 Lee ....................... G02B 6/3874

FOREIGN PATENT DOCUMENTS

| JP | 2005-084138 A | 3/2005 |
| JP | 2005-134528 A | 5/2005 |
| JP | 2006-308736 A | 11/2006 |
| JP | 2011-070101 A | 4/2011 |
| JP | 2012-230275 A | 11/2012 |
| JP | 2013-225062 A | 10/2013 |
| WO | WO 2013/001675 A1 * | 1/2013 |
| WO | WO 2015/108181 A1 * | 7/2015 |

* cited by examiner

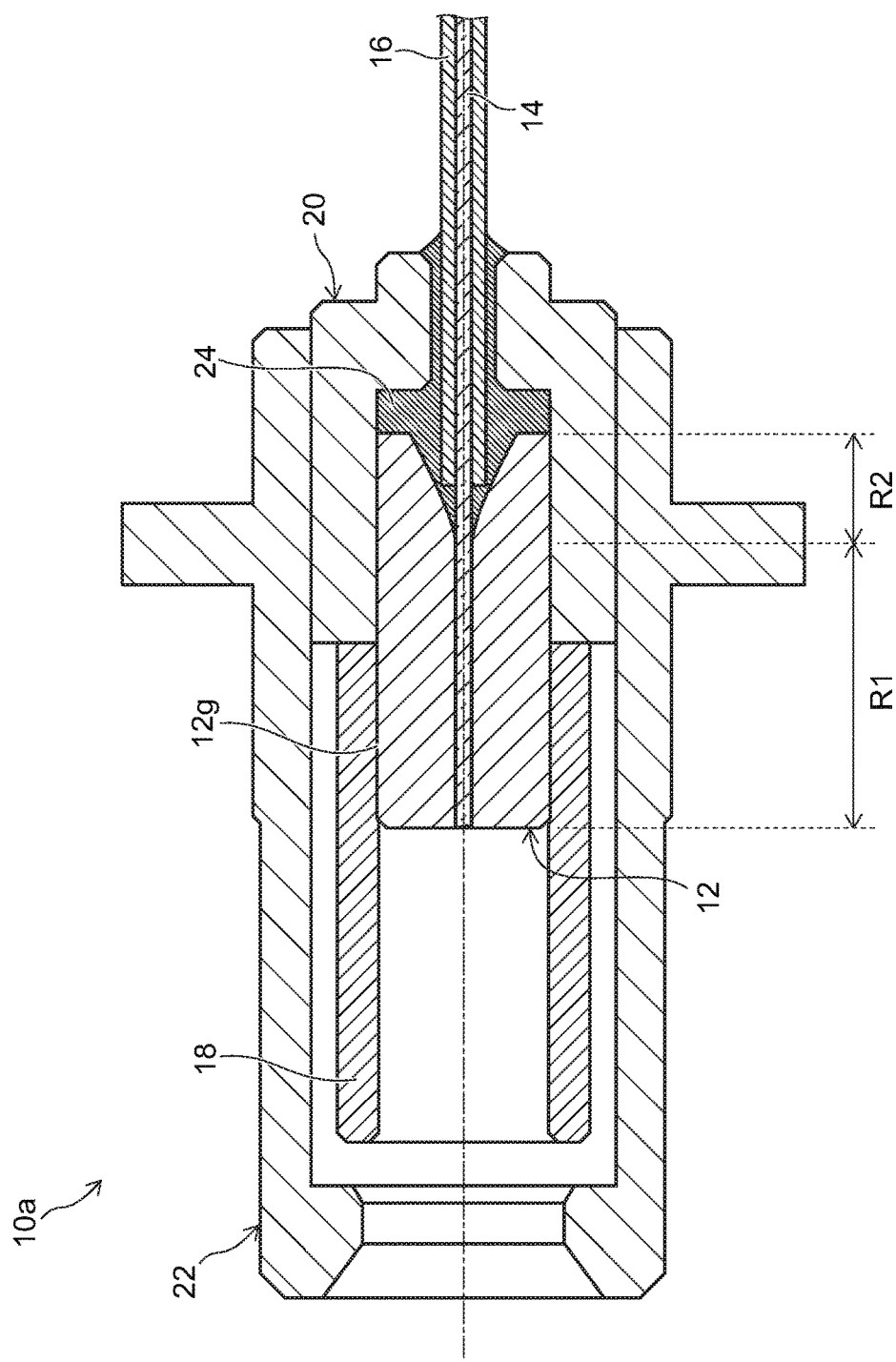

US 10,345,534 B2

PIGTAIL-TYPE OPTICAL RECEPTACLE

CROSS-REFERENCE TO RELATED APPLICATIONS

This is a continuation application of International Application PCT/JP2017/018866, filed on May 19, 2017. This application also claims priority to Japanese Application No. 2016-101550, filed on May 20, 2016, Japanese Application No. 2017-018454, filed on Feb. 3, 2017, Japanese Application No. 2017-099521, filed on May 19, 2017, and Japanese Application No. 2017-099522, filed on May 19, 2017; the entire contents of each are incorporated herein by reference.

FIELD OF THE INVENTION

Embodiments described herein relate generally to a pigtail-type optical receptacle.

BACKGROUND OF THE INVENTION

An optical receptacle is used as a part for optically connecting an optical fiber connector to an optical element such as a light receiving element, a light-emitting element, or the like in an optical module of an optical communication transceiver. For such an optical receptacle, a pigtail-type optical receptacle also is known in which the optical fiber is drawn out from a ferrule.

For example, in JP-A 2012-230275 (Kokai), a pigtail-type optical receptacle is proposed in which a ferrule that holds an optical fiber is held by a holder; and the holding force of the parts such as the ferrule, the holder, etc., is increased by press-fitting the holder into a case.

Also, in JP-A 2012-230275 (Kokai), because the rear end surface of the ferrule is positioned on the rear end side of the press-fit region of the case, the pressure that is applied to the rear end portion of the ferrule from the holder is reduced. Thereby, an undesirable concentration of an external force locally at one portion of the optical fiber at the rear end portion of the ferrule due to the inner diameter of the ferrule contracting due to the press-fitting can be suppressed. Also, the increase of the loss and the decrease of the strength of the optical fiber due to the concentration of the external force can be suppressed; and the reliability of the pigtail-type optical receptacle can be increased.

However, compared to a configuration in which the rear end of the ferrule is disposed in the press-fit region, it is necessary to set the ferrule and/or the holder to be long in the configuration in which the rear end surface of the ferrule is positioned on the rear end side of the press-fit region of the case. Therefore, for the pigtail-type optical receptacle, it has been difficult to downsize in the longitudinal direction of the receptacle main body portion (the portion frontward of the drawn out optical fiber) including the ferrule, the case, etc.

Generally, the configurations of optical transceivers are standardized; and the space of the electrical circuit including the optical elements and the like is undesirably encroached when the receptacle main body portion is lengthened. Also, higher speeds are necessary for optical transceivers as the IP traffic increases; and the space that is necessary for the electrical circuit is increasing due to the higher speeds of the modulation rate of the optical signals emitted from the optical elements, etc.

Therefore, for the pigtail-type optical receptacle, it is desirable to be able to downsize without causing a decrease of the reliability due to the concentration of the local external force in the optical fiber, etc.

SUMMARY OF THE INVENTION

According to an embodiment of the invention, a pigtail-type optical receptacle that includes a ferrule, an optical fiber, a protective member, a sleeve, a holder, and a housing is provided; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, engages an outer surface of the holder, and covers the ferrule and at least a portion of the sleeve; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; and the holder holds a portion of the outer surface of the ferrule rearward of the first region.

BRIEF DESCRIPTION OF THE DRAWINGS

FIG. 3 is a cross-sectional view illustrating a modification of the pigtail-type optical receptacle according to the first embodiment;

DETAILED DESCRIPTION

Figure 1:
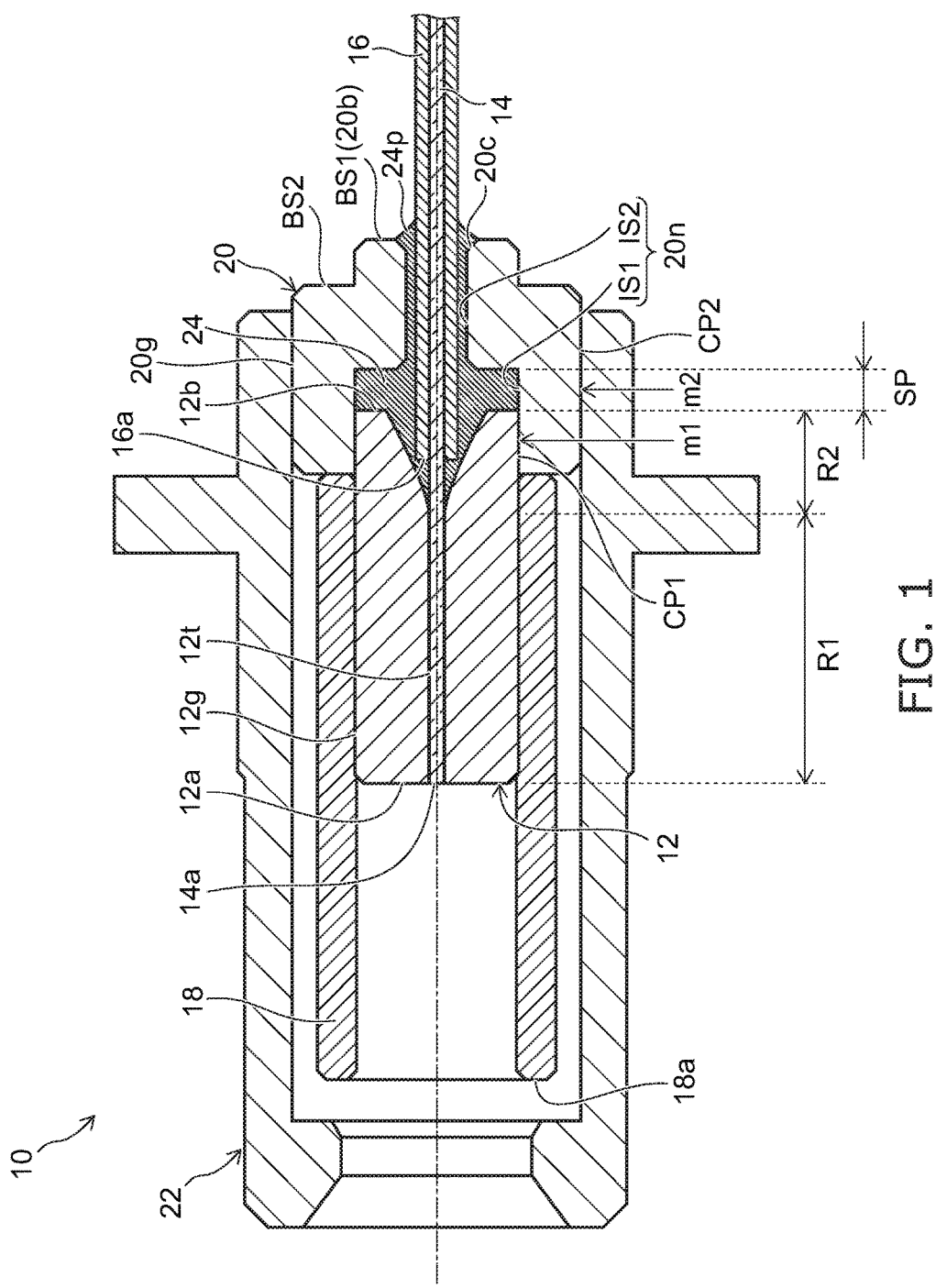
FIG. 1 is a cross-sectional view illustrating a pigtail-type optical receptacle according to a first embodiment.

A first invention is a pigtail-type optical receptacle that includes a ferrule, an optical fiber, a protective member, a sleeve, a holder, and a housing; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, engages an outer surface of the holder, and covers the ferrule and at least a portion of the sleeve; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; and the holder holds a portion of the outer surface of the ferrule rearward of the first region.

According to the pigtail-type optical receptacle, because the ferrule and at least a portion of the sleeve are housed in the housing, the lengths of the ferrule and/or the housing can be shortened compared to a configuration in which the rear end portion of the ferrule protrudes rearward of the housing. Also, the holder holds the portion of the outer surface of the ferrule rearward of the first region. Thereby, for example, even in the case where the ferrule contracts, an undesirable concentration of an external force in the optical fiber at the boundary portion between the first region holding the optical fiber and the second region not holding the optical fiber can be suppressed. Accordingly, a pigtail-type optical receptacle that can be downsized without causing a decrease of the reliability can be provided.

A second invention is the pigtail-type optical receptacle of the first invention, wherein a change of the width in the orthogonal direction of the through-hole in the second region has a curved configuration. The curved configuration is convex toward a central axis side of the through-hole.

According to the pigtail-type optical receptacle, the undesirable concentration of the external force in the optical fiber at the boundary portion between the first region and the second region can be suppressed further.

A third invention is the pigtail-type optical receptacle of the second invention, wherein the through-hole of the ferrule further includes a third region disposed rearward of the second region; and a change of the width in the orthogonal direction of the through-hole in the third region has a linear configuration.

According to the pigtail-type optical receptacle, the undesirable concentration of the external force in the optical fiber at the boundary portion between the first region and the second region can be suppressed further.

A fourth invention is the pigtail-type optical receptacle of the first invention, wherein a front end of the protective member is positioned inside the second region of the through-hole.

According to the pigtail-type optical receptacle, the length of the portion of the optical fiber protruding from the protective member can be shortened as much as possible. Thereby, for example, flexing of the optical fiber can be suppressed; and the optical fiber can be inserted easily into the through-hole of the ferrule. The manufacturability of the pigtail-type optical receptacle can be improved.

A fifth invention is the pigtail-type optical receptacle of the third invention, wherein a front end of the protective member is positioned inside the third region of the through-hole.

According to the pigtail-type optical receptacle, the length of the portion of the optical fiber protruding from the protective member can be shortened as much as possible. Thereby, for example, flexing of the optical fiber can be suppressed; and the optical fiber can be inserted easily into the through-hole of the ferrule. The manufacturability of the pigtail-type optical receptacle can be improved.

A sixth invention is the pigtail-type optical receptacle of the first invention, wherein the holder holds the rear end side of the ferrule by press-fitting.

According to the pigtail-type optical receptacle, the ferrule can be held appropriately by a simple configuration.

A seventh invention is the pigtail-type optical receptacle of the first invention, wherein a rear end of the holder is positioned rearward of the rear end of the ferrule; the holder surrounds a portion of the optical fiber and a portion of the protective member; and the optical fiber and the protective member further extend outside the holder and are fixedly bonded to the holder by an elastic member filled into the through-hole and into the holder.

According to the pigtail-type optical receptacle, deformation and/or tilting due to an external force of the portion of the optical fiber protruding from the protective member can be suppressed. Also, the protrusion from or the reverse retraction into the ferrule of the front end of the optical fiber due to the application of the external force can be suppressed.

An eighth invention is the pigtail-type optical receptacle of the seventh invention, wherein an inner perimeter surface of the holder includes a first inner perimeter portion and a second inner perimeter portion; the first inner perimeter portion engages the outer surface of the ferrule; the second inner perimeter portion is positioned rearward of the first inner perimeter portion, protrudes inward from the first inner perimeter portion, and surrounds a portion of the optical fiber and a portion of the protective member; a gap in the axial direction is provided between the second inner perimeter portion and the rear end of the ferrule; and the elastic member is filled also into the gap.

According to the pigtail-type optical receptacle, the deformation and/or the positional shift of the optical fiber front end portion due to the external force can be suppressed further.

A ninth invention is the pigtail-type optical receptacle of the first invention, wherein the holder has a first rear end surface and a second rear end surface; and the second rear end surface is recessed frontward of the first rear end surface on an outer perimeter side of the first rear end surface.

According to the pigtail-type optical receptacle, for example, the first rear end surface can be used as a receiving surface of the bonding agent (the elastic member) when fixedly bonding the optical fiber and the protective member;

and the second rear end surface can be used as a positional alignment surface between the holder and the housing. Thereby, the undesirable flowing of the bonding agent to the positional alignment surface and the undesirable occurrence of the positional shift between the holder and the housing can be suppressed. Also, the protective member can be fixedly bonded in a longer region by setting the length of the portion of the first rear end surface to be longer than the length of the holder necessary to be held by the housing. Thereby, the deformation and/or the positional shift of the optical fiber front end portion can be suppressed further.

A tenth invention is the pigtail-type optical receptacle of the first invention, wherein the outer surface of the holder includes a first outer perimeter portion and a second outer perimeter portion; the first outer perimeter portion is held by the housing; and the second outer perimeter portion is provided at a front end portion of the holder and is recessed inward from the first outer perimeter portion.

According to the pigtail-type optical receptacle, the portion where the holder is held by the housing can be shifted rearward; and the undesirable concentration of the external force in the optical fiber at the boundary portion between the first region and the second region can be suppressed further.

An eleventh invention is the pigtail-type optical receptacle of the first invention, wherein the holder includes a chamfer portion between a rear end surface and an inner perimeter surface.

According to the pigtail-type optical receptacle, by providing the chamfer portion, the optical fiber can be inserted easily into the holder; and the manufacturability can be improved. Also, the chamfer portion can be used as a bonding agent reservoir when fixedly bonding the optical fiber and the protective member; and the undesirable flowing of the bonding agent to the positional alignment surface can be suppressed further.

A twelfth invention is the pigtail-type optical receptacle of the seventh invention, wherein the elastic member includes a protrusion protruding outside the holder on the rear end side of the holder and covering a corner portion between the rear end of the holder and an outer surface of the protective member.

According to the pigtail-type optical receptacle, the undesirable bending of the optical fiber locally at the corner portion between the rear end of the holder and the outer surface of the protective member when the load is applied by the external force can be suppressed.

A thirteenth invention is the pigtail-type optical receptacle of the first invention, wherein the housing holds the holder by press-fitting.

According to the pigtail-type optical receptacle, the holder can be held appropriately by a simple configuration.

A fourteenth invention is the pigtail-type optical receptacle of the first invention, wherein the outer surface of the ferrule includes a first contact portion contacting an inner perimeter surface of the holder; the outer surface of the holder includes a second contact portion contacting an inner perimeter surface of the housing; and an intermediate point in the axial direction of the second contact portion is positioned rearward of an intermediate point in the axial direction of the first contact portion.

According to the pigtail-type optical receptacle, for example, even in the case where the holder is press-fitted into the housing, etc., the clamping force due to the press-fitting is dispersed in a wide region by the second contact portion; and the undesirable concentration of the external force in the optical fiber at the boundary portion between the first region and the second region can be suppressed further.

A fifteenth invention is a pigtail-type optical receptacle that includes a ferrule, an optical fiber, a protective member, a sleeve, a holder, and a housing; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, engages an outer surface of the holder, and covers the ferrule and at least a portion of the sleeve; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; and the width in the orthogonal direction of the through-hole in the second region changes in a curved configuration having a proportion of the change increasing toward the rear end side.

According to the pigtail-type optical receptacle, because the ferrule and at least a portion of the sleeve are housed in the housing, the lengths of the ferrule and/or the housing can be shortened compared to a configuration in which the rear end portion of the ferrule protrudes rearward of the housing. Also, the width in the orthogonal direction of the through-hole in the second region changes in a curved configuration in which the proportion of the change increases toward the rear end side. Thereby, for example, even in the case where the ferrule contracts, an undesirable concentration of an external force in the optical fiber at the boundary portion between the first region holding the optical fiber and the second region not holding the optical fiber can be suppressed. Accordingly, a pigtail-type optical receptacle that can be downsized without reducing the reliability can be provided.

A sixteenth invention is a pigtail-type optical receptacle that includes a ferrule, an optical fiber, a protective member, a sleeve, a holder, and a housing; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, engages an outer surface of the holder, and covers the ferrule and at least a portion of the sleeve; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; and the housing engages the outer surface of the holder rearward of the first region.

According to the pigtail-type optical receptacle, because the ferrule and at least a portion of the sleeve are housed in the housing, the lengths of the ferrule and/or the housing can be shortened compared to a configuration in which the rear end portion of the ferrule protrudes rearward of the housing. Also, the housing engages the outer surface of the holder rearward of the first region. Thereby, for example, the undesirable concentration, in the optical fiber at the boundary portion between the first region holding the optical fiber and the second region not holding the optical fiber, of the external force caused by the housing engaging the outer surface of the holder can be suppressed. Accordingly, a pigtail-type optical receptacle that can be downsized without reducing the reliability can be provided.

A seventeenth invention is the pigtail-type optical receptacle of the sixteenth invention, wherein the outer surface of the holder includes a first outer perimeter portion and a second outer perimeter portion; the first outer perimeter portion is held by the housing; the second outer perimeter portion is provided at a front end portion of the holder and is recessed inward from the first outer perimeter portion; and the first outer perimeter portion is positioned rearward of the first region.

According to the pigtail-type optical receptacle, the undesirable concentration, in the optical fiber at the boundary portion between the first region holding the optical fiber and the second region not holding the optical fiber, of the external force caused by the housing engaging the outer surface of the holder can be suppressed.

An eighteenth invention is the pigtail-type optical receptacle of the sixteenth invention, wherein an inner surface of the housing includes a first inner perimeter portion and a second inner perimeter portion; the first inner perimeter portion engages the outer surface of the holder; the second inner perimeter portion is provided frontward of the first inner perimeter portion and widens outward from the first inner perimeter portion; and the first inner perimeter portion is positioned rearward of the first region.

According to the pigtail-type optical receptacle, the undesirable concentration, in the optical fiber at the boundary portion between the first region holding the optical fiber and the second region not holding the optical fiber, of the external force caused by the housing engaging the outer surface of the holder can be suppressed.

A nineteenth invention is the pigtail-type optical receptacle of the eighteenth invention, wherein the second inner perimeter portion is connected to the first inner perimeter portion via a tilted surface or a curved surface.

According to the pigtail-type optical receptacle, the housing can be formed easily even in the case where the first inner perimeter portion and the second inner perimeter portion are provided in the inner surface of the housing.

A twentieth invention is a pigtail-type optical receptacle that includes a ferrule, an optical fiber, a protective member, a sleeve, a holder, and a housing; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, is mounted to the holder, and covers the ferrule and at least a portion of the sleeve; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; the holder includes a flange protruding outward from the housing and being provided frontward of the second region; and the housing is mounted to the holder frontward of the flange.

According to the pigtail-type optical receptacle, because the ferrule and at least a portion of the sleeve are housed in the housing, the lengths of the ferrule and/or the housing can be shortened compared to a configuration in which the rear end portion of the ferrule protrudes rearward of the housing. Also, the holder includes the flange protruding outward from the housing and being provided frontward of the second region; and the housing is mounted to the holder frontward of the flange. Thereby, for example, the undesirable concentration, in the optical fiber at the boundary portion between the first region holding the optical fiber and the second region not holding the optical fiber, of the external force caused by mounting the housing can be suppressed. Accordingly, a pigtail-type optical receptacle that can be downsized without reducing the reliability can be provided.

A twenty-first invention is a pigtail-type optical receptacle that includes a ferrule, an optical fiber, a protective member, a sleeve, a holder, a housing, a first elastic member, and a second elastic member; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, engages an outer surface of the holder, and covers the ferrule and at least a portion of the sleeve; the first elastic member is filled into the through-hole and into the holder; the second elastic member covers a corner portion between a rear end of the holder and an outer surface of the protective member; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; the holder holds a portion of the outer surface of the ferrule rearward of the first region; the rear end of the holder is positioned rearward of the rear end of the ferrule; the holder surrounds a portion of the optical fiber and a portion of the protective member; the optical fiber and the protective member further extend outside the holder and are fixedly bonded to the holder by the first elastic member; and a hardness of the second elastic member is lower than a hardness of the first elastic member.

According to the pigtail-type optical receptacle, because the ferrule and at least a portion of the sleeve are housed in the housing, the lengths of the ferrule and/or the housing can be shortened compared to a configuration in which the rear end portion of the ferrule protrudes rearward of the housing.

Also, the holder holds a portion of the outer surface of the ferrule rearward of the first region. Thereby, for example, even in the case where the ferrule contracts, an undesirable concentration of an external force in the optical fiber at the boundary portion between the first region holding the optical fiber and the second region not holding the optical fiber can be suppressed. Accordingly, a pigtail-type optical receptacle that can be downsized without reducing the reliability can be provided.

Also, because the optical fiber and the protective member are fixedly bonded to the holder by the first elastic member, the deformation and/or tilting due to an external force of the portion of the optical fiber protruding from the protective member can be suppressed. Also, the protrusion from or the reverse retraction into the ferrule of the front end of the optical fiber due to the application of the external force can be suppressed.

By providing the second elastic member, the starting point of the bending when the optical fiber is bent by handling, etc., can be distal to the first elastic member. In such a case, by setting the hardness of the second elastic member to be lower than the hardness of the first elastic member, the stress that is applied to the protective member at the boundary with the second elastic member can be suppressed even when the optical fiber is bent by handling, etc. Thereby, the damage of the protective member at the vicinity of the boundary with the first elastic member and/or the second elastic member, etc., can be suppressed; and the risk of breakage of the optical fiber can be reduced further.

A twenty-second invention is a pigtail-type optical receptacle that includes a ferrule, an optical fiber, a protective member, a sleeve, a holder, a housing, a first elastic member, and a second elastic member; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, engages an outer surface of the holder, and covers the ferrule and at least a portion of the sleeve; the first elastic member is filled into the through-hole and into the holder; the second elastic member covers a corner portion between a rear end of the holder and an outer surface of the protective member; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; the width in the orthogonal direction of the through-hole in the second region changes in a curved configuration having a proportion of the change increasing toward the rear end side; the rear end of the holder is positioned rearward of the rear end of the ferrule; the holder surrounds a portion of the optical fiber and a portion of the protective member; the optical fiber and the protective member further extend outside the holder and are fixedly bonded to the holder by the first elastic member; and a hardness of the second elastic member is lower than a hardness of the first elastic member.

According to the pigtail-type optical receptacle, because the ferrule and at least a portion of the sleeve are housed in the housing, the lengths of the ferrule and/or the housing can be shortened compared to a configuration in which the rear end portion of the ferrule protrudes rearward of the housing. Also, the width in the orthogonal direction of the through-hole in the second region changes in a curved configuration in which the proportion of the change increases toward the rear end side. Thereby, for example, even in the case where the ferrule contracts, an undesirable concentration of an external force in the optical fiber at the boundary portion between the first region holding the optical fiber and the second region not holding the optical fiber can be suppressed. Accordingly, a pigtail-type optical receptacle that can be downsized without reducing the reliability can be provided.

Also, because the optical fiber and the protective member are fixedly bonded to the holder by the first elastic member, the deformation and/or tilting due to an external force of the portion of the optical fiber protruding from the protective member can be suppressed. Also, the protrusion from or the reverse retraction into the ferrule of the front end of the optical fiber due to the application of the external force can be suppressed.

Also, by providing the second elastic member, the starting point of the bending when the optical fiber is bent by the handling, etc., can be distal to the first elastic member. In such a case, by setting the hardness of the second elastic member to be lower than the hardness of the first elastic member, the stress that is applied to the protective member at the boundary with the second elastic member when the optical fiber is bent by handling, etc., can be suppressed. Thereby, the damage of the protective member at the vicinity of the boundary with the first elastic member and/or the second elastic member, etc., can be suppressed; and the risk of breakage of the optical fiber can be reduced further.

A twenty-third invention is a pigtail-type optical receptacle that includes a ferrule, an optical fiber, a protective member, a sleeve, a holder, a housing, a first elastic member, and a second elastic member; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, engages an outer surface of the holder, and covers the ferrule and at least a portion of the sleeve; the first elastic member is filled into the through-hole and into the holder; the second elastic member covers a corner portion between a rear end of the holder and an outer surface of the protective member; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; the housing engages the outer surface of the holder rearward of the first region; the rear end of the holder is positioned rearward of the rear end of the ferrule; the holder surrounds a portion of the optical fiber and a portion of the protective member; the optical fiber and the protective member further extend outside the holder and are fixedly bonded to the holder by the first elastic member; and a hardness of the second elastic member is lower than a hardness of the first elastic member.

According to the pigtail-type optical receptacle, because the ferrule and at least a portion of the sleeve are housed in the housing, the lengths of the ferrule and/or the housing can be shortened compared to a configuration in which the rear end portion of the ferrule protrudes rearward of the housing. Also, the housing engages the outer surface of the holder rearward of the first region. Thereby, for example, the undesirable concentration, in the optical fiber at the boundary portion between the first region holding the optical fiber and the second region not holding the optical fiber, of the external force caused by the housing engaging the outer surface of the holder can be suppressed. Accordingly, a pigtail-type optical receptacle that can be downsized without reducing the reliability can be provided.

Also, because the optical fiber and the protective member are fixedly bonded to the holder by the first elastic member, the deformation and/or tilting due to an external force of the portion of the optical fiber protruding from the protective member can be suppressed. Also, the protrusion from or the reverse retraction into the ferrule of the front end of the optical fiber due to the application of the external force can be suppressed.

By providing the second elastic member, the starting point of the bending when the optical fiber is bent by the handling, etc., can be distal to the first elastic member. In such a case, by setting the hardness of the second elastic member to be lower than the hardness of the first elastic member, the stress that is applied to the protective member at the boundary with the second elastic member can be suppressed even when the optical fiber is bent by handling, etc. Thereby, the damage of the protective member at the vicinity of the boundary with the first elastic member and/or the second elastic member, etc., can be suppressed; and the risk of breakage of the optical fiber can be reduced further.

A twenty-fourth invention is a pigtail-type optical receptacle that includes a ferrule, an optical fiber, a protective member, a sleeve, a holder, a housing, a first elastic member, and a second elastic member; the ferrule has a tubular configuration and has a through-hole extending in an axial direction; the optical fiber is held by the ferrule in a state of being inserted into the through-hole and extends outside the ferrule from a rear end side of the ferrule; the protective member covers a portion of the optical fiber extending outside the ferrule; the sleeve has a tubular configuration, engages an outer surface of the ferrule, and is mounted on a front end side of the ferrule; the holder has a tubular configuration, engages the outer surface of the ferrule, and holds the rear end side of the ferrule; the housing has a tubular configuration, is mounted to the holder, and covers the ferrule and at least a portion of the sleeve; the first elastic member is filled into the through-hole and into the holder; the second elastic member covers a corner portion between a rear end of the holder and an outer surface of the protective member; the through-hole of the ferrule includes a first region and a second region; a width in an orthogonal direction of the through-hole in the first region corresponds to a width in the orthogonal direction of the optical fiber; the orthogonal direction is orthogonal to the axial direction; the second region is disposed rearward of the first region; the width in the orthogonal direction of the through-hole in the second region widens toward the rear end side of the ferrule; the holder includes a flange protruding outward from the housing and being provided frontward of the second region; the housing is mounted to the holder frontward of the flange; the rear end of the holder is positioned rearward of the rear end of the ferrule; the holder surrounds a portion of the optical fiber and a portion of the protective member; the optical fiber and the protective member further extend outside the holder and are fixedly bonded to the holder by the first elastic member; and a hardness of the second elastic member is lower than a hardness of the first elastic member.

According to the pigtail-type optical receptacle, because the ferrule and at least a portion of the sleeve are housed in the housing, the lengths of the ferrule and/or the housing can be shortened compared to a configuration in which the rear end portion of the ferrule protrudes rearward of the housing. Also, the holder includes the flange protruding outward from the housing and being provided frontward of the second region; and the housing is mounted to the holder frontward of the flange.

Thereby, for example, the undesirable concentration, in the optical fiber at the boundary portion between the first region holding the optical fiber and the second region not holding the optical fiber, of the external force caused by mounting the housing can be suppressed. Accordingly, a pigtail-type optical receptacle that can be downsized without reducing the reliability can be provided.

Also, because the optical fiber and the protective member are fixedly bonded to the holder by the first elastic member, the deformation and/or tilting due to an external force of the portion of the optical fiber protruding from the protective member can be suppressed. Also, the protrusion from or the reverse retraction into the ferrule of the front end of the optical fiber due to the application of the external force can be suppressed.

Also, by providing the second elastic member, the starting point of the bending when the optical fiber is bent by the handling, etc., can be distal to the first elastic member. In such a case, by setting the hardness of the second elastic member to be lower than the hardness of the first elastic member, the stress that is applied to the protective member at the boundary with the second elastic member can be suppressed even when the optical fiber is bent by handling, etc. Thereby, the damage of the protective member at the vicinity of the boundary with the first elastic member and/or the second elastic member, etc., can be suppressed; and the risk of breakage of the optical fiber can be reduced further.

A twenty-fifth invention is the pigtail-type optical receptacle of the twenty-first invention, wherein a width of the second elastic member at a rear end surface of the holder is wider than a width of the first elastic member at the rear end surface of the holder.

According to the pigtail-type optical receptacle, the wall thickness of the second elastic member can be ensured appropriately regardless of the final quality of the width of the first elastic member at the rear end surface of the holder; and the damage of the second elastic member itself, etc., can be suppressed even when the optical fiber is bent due to the stress from the outside, etc.

A twenty-sixth invention is the pigtail-type optical receptacle of the twenty-first invention, wherein the holder has a first rear end surface and a second rear end surface; the second rear end surface is recessed frontward of the first rear end surface on an outer perimeter side of the first rear end surface; and a width in a direction orthogonal to the axial direction of the second elastic member is narrower than a width in the direction orthogonal to the axial direction of the first rear end surface.

According to the pigtail-type optical receptacle, for example, the first rear end surface can be used as a receiving surface of the bonding agent (the elastic member) when fixedly bonding the optical fiber and the protective member; and the second rear end surface can be used as a positional alignment surface between the holder and the housing. Thereby, the undesirable flowing of the bonding agent to the positional alignment surface and the undesirable occurrence of the positional shift between the holder and the housing can be suppressed. Also, the protective member can be fixedly bonded in a longer region by setting the length of the portion of the first rear end surface to be longer than the length of the holder necessary to be held by the housing. Thereby, the deformation and/or the positional shift of the optical fiber front end portion can be suppressed further.

Also, the flowing of the second elastic member to the second rear end surface can be suppressed; and the appropriate positional alignment when assembling is possible.

A twenty-seventh invention is the pigtail-type optical receptacle of the twenty-first invention, wherein the first elastic member includes a protrusion protruding outside the holder on the rear end side of the holder; the protrusion covers a corner portion between the rear end of the holder and the outer surface of the protective member; and the second elastic member covers the protrusion.

According to the pigtail-type optical receptacle, the undesirable bending of the optical fiber locally at the corner portion between the rear end of the holder and the outer surface of the protective member when the load is applied by the external force can be suppressed.

A twenty-eighth invention is the pigtail-type optical receptacle of the twenty-seventh invention, wherein a length in the axial direction of the second elastic member is longer than a length in the axial direction of the protrusion.

According to the pigtail-type optical receptacle, the wall thickness of the second elastic member can be ensured appropriately regardless of the final quality of the length in the axial direction of the protrusion; and the damage of the second elastic member itself, etc., can be suppressed even when the optical fiber is bent due to the stress from the outside, etc.

A twenty-ninth invention is the pigtail-type optical receptacle of the twenty-seventh invention, wherein an average tilt angle between an outer surface of the second elastic member and a rear end surface of the holder is not less than an average tilt angle between an outer surface of the protrusion and the rear end surface of the holder.

According to the pigtail-type optical receptacle, the wall thickness of the second elastic member can be ensured appropriately regardless of the final quality of the width of the first elastic member at the rear end surface of the holder; and the damage of the second elastic member itself, etc., can be suppressed even when the optical fiber is bent due to the stress from the outside, etc.

Embodiments of the invention will now be illustrated with reference to the drawings. Similar components in the drawings are marked with the same reference numerals; and a detailed description is omitted as appropriate.

First Embodiment

FIG. 1 is a cross-sectional view illustrating a pigtail-type optical receptacle according to a first embodiment.

As illustrated in FIG. 1, the pigtail-type optical receptacle (hereinbelow, called the optical receptacle) 10 includes a ferrule 12, an optical fiber 14, a protective member 16, a sleeve 18, a holder 20, and a housing 22.

The ferrule 12 has a tubular configuration that has a through-hole 12t extending in the axial direction. The through-hole 12t pierces in a linear configuration between a front end 12a and a rear end 12b of the ferrule 12. The optical fiber 14 is held by the ferrule 12 in a state of being inserted into the through-hole 12t, and extends outside the ferrule 12 from the rear end 12b side of the ferrule 12. In other words, the ferrule 12 holds one end portion of the optical fiber 14.

The optical fiber 14 is inserted into substantially the entire through-hole 12t. A front end 14a of the optical fiber 14 is substantially coplanar with the front end 12a of the ferrule 12. The front end 12a of the ferrule 12 and the front end 14a of the optical fiber 14 form the PC (Physical Contact) surface for a plug ferrule (not illustrated) that is inserted into the optical receptacle 10. The optical fiber 14 is connected optically to the plug ferrule inserted into the optical receptacle 10. In the example, the front ends 12a and 14a are polished into planar configurations. For example, the front ends 12a and 14a may be polished into convex spherical configurations, etc.

For example, the end portion of the optical fiber 14 on the side opposite to the ferrule 12 is connected optically to an optical element such as a semiconductor laser element or the like via an optical connector or the like. Thereby, the optical receptacle 10 optically connects the optical element to the inserted plug ferrule via the optical fiber 14.

For example, the ferrule 12 has a cylindrical configuration. For example, the cross section of the optical fiber 14 is a substantially circular fine wire configuration. The through-hole 12t is formed to correspond to the cross-sectional configuration of the optical fiber 14. In other words, the cross-sectional configuration of the through-hole 12t is substantially circular. More specifically, the "cross section" here is a cross section orthogonal to the axial direction of the ferrule 12 having the tubular configuration. The exterior configuration of the ferrule 12 in the cross section orthogonal to the axial direction is not limited to a circle and may be a polygon, etc.

For example, the ferrule 12 includes a ceramic, glass, etc. More favorably, a zirconia ceramic is used. The optical fiber 14 includes, for example, a core that extends along the axial direction, and cladding that surrounds the periphery of the core. The refractive index of the core is higher than the refractive index of the cladding. The core and the cladding of the optical fiber 14 include, for example, quartz glass. An impurity may be added to the quartz glass. Also, the optical fiber 14 is flexible and can be flexed in any direction.

The protective member 16 covers the portion of the optical fiber 14 extending outside the ferrule 12. The protective member 16 is flexible and flexes in any direction with the optical fiber 14. The protective member 16 includes, for example, a resin material such as a polyester elastomer, an acrylate resin, etc. The outer diameter of the protective member 16 is, for example, about 0.2 mm to 0.5 mm. The lengths of the portions of the optical fiber 14 and the protective member 16 extending outside the ferrule 12 are, for example, about 80 mm. The lengths of the portions of the optical fiber 14 and the protective member 16 extending outside the ferrule 12 are not limited thereto and may be any length.

The sleeve 18 engages an outer surface 12g of the ferrule 12 and is mounted on the front end 12a side of the ferrule 12. A front end 18a of the sleeve 18 protrudes frontward of the front end 12a of the ferrule 12. The sleeve 18 surrounds the front end 12a of the ferrule 12 and the front end 14a of the optical fiber 14 around the axes. The sleeve 18 holds the plug ferrule inserted from the front end side and allows the optical connection between the optical fiber 14 and the plug ferrule.

For example, the sleeve 18 has a cylindrical configuration. The inner diameter of the sleeve 18 is substantially the same as the outer diameter of the ferrule 12. Thereby, the sleeve 18 engages the outer surface 12g of the ferrule 12. The cross-sectional configuration of the sleeve 18 corresponds to the cross-sectional configuration of the ferrule 12. For example, in the case where the exterior configuration of the ferrule 12 is a quadrilateral, the sleeve 18 is formed in a quadrilateral tubular configuration.

Also, the sleeve 18 has a slit extending in the axial direction. More specifically, the cross-sectional configuration of the sleeve 18 is a substantially C-shaped configuration. The sleeve 18 is a so-called split sleeve. The slit is provided as necessary and is omissible. The sleeve 18 may have a tubular configuration that is continuous in a ring configuration around the axis.

The sleeve 18 includes, for example, a resin material, a metal material, a ceramic, etc. More favorably, a zirconia ceramic is used.

The holder 20 engages the outer surface 12g of the ferrule 12 and holds the rear end 12b side of the ferrule 12. For example, the holder 20 has a cylindrical configuration. Similarly to the sleeve 18, the cross-sectional configuration of the holder 20 corresponds to the cross-sectional configuration of the ferrule 12. The holder 20 may be a tube having any cross-sectional configuration corresponding to the ferrule 12. The holder 20 includes, for example, a metal material such as stainless steel, etc. The material of the holder 20 may be a resin material, a ceramic, etc.

The housing 22 engages an outer surface 20g of the holder 20 and covers the ferrule 12 and the sleeve 18. The housing 22 covers the ferrule 12 and the sleeve 18 around the axes and protects the ferrule 12 and the sleeve 18 from external forces, etc. Thus, the holder 20 holds the ferrule 12 and the sleeve 18 in a state of being housed inside the housing 22. For example, the housing 22 has a cylindrical configuration. The outer diameter of the holder 20 is larger than the outer diameter of the sleeve 18. The inner diameter of the housing 22 is substantially the same as the outer diameter of the holder 20. The housing 22 engages only the outer surface 20g of the holder 20 without engaging the outer surface of the sleeve 18.

The housing 22 may be a tube having any cross-sectional configuration corresponding to the holder 20. Also, in the example, the housing 22 covers substantially the entire outer surface of the sleeve 18. In other words, the entire sleeve 18 is housed inside the housing 22. This is not limited thereto; for example, a portion of the sleeve 18 may protrude frontward of the housing 22. It is sufficient for the housing 22 to cover at least a portion of the sleeve 18. The housing 22 includes, for example, a metal material such as stainless steel, etc. The material of the housing 22 may be a resin material, a ceramic, etc.

The through-hole 12t of the ferrule 12 includes a first region R1 and a second region R2. The first region R1 is a region where the width in an orthogonal direction orthogonal to the axial direction corresponds to the width in the orthogonal direction of the optical fiber 14. In other words, the first region R1 is a portion of the through-hole 12t having substantially the same diameter as the outer diameter of the optical fiber 14. The diameter of the first region R1 is substantially constant along the axial direction. Also, the first region R1 is continuous with the front end 12a of the ferrule 12. The ferrule 12 holds the optical fiber 14 in the first region R1.

The second region R2 is disposed rearward of the first region R1. The second region R2 is continuous with the first region R1. Also, in the example, the second region R2 is continuous with the rear end 12b of the ferrule 12. The second region R2 is a region where the width in the orthogonal direction widens toward the rear end 12b side of the ferrule 12. In other words, the second region R2 is a portion of the through-hole 12t in which the diameter widens toward the rear end 12b side.

In the second region R2, for example, the diameter widens continuously toward the rear end 12b side. For example, the diameter in the second region R2 may widen in stages toward the rear end 12b side. However, by setting the diameter of the second region R2 to widen continuously, for example, the front end 14a of the optical fiber 14 can be inserted easily into the through-hole 12t along the tilt of the second region R2 when inserting the optical fiber 14 into the through-hole 12t. For example, the manufacturability of the optical receptacle 10 can be improved.

The holder 20 holds only the portion of the outer surface 12g of the ferrule 12 rearward of the first region R1. In the example, the holder 20 holds only the portion of the outer surface 12g of the ferrule 12 opposing the second region R2.

A front end 16a of the protective member 16 is positioned inside the second region R2 of the through-hole 12t. The protective member 16 covers the portion of the optical fiber 14 not held with the ferrule 12.

For example, the holder 20 holds the rear end 12b side of the ferrule 12 by press-fitting. The ferrule 12 is fixed by press-fitting into the holder 20. For example, the housing 22 holds the holder 20 by press-fitting. The holder 20 is fixed by press-fitting into the housing 22. The holding of the ferrule 12 by the holder 20 and the holding of the holder 20 by the housing 22 are not limited to press-fitting and may be bonding, etc. However, by fixing each member by press-fitting as recited above, the holding force can be increased compared to the case of fixedly bonding, etc. The members can be held appropriately by a simple configuration. The minimum length in the axial direction necessary to fix the ferrule 12 in the holder 20 by press-fitting is, for example, about 0.3 mm to 0.5 mm. However, further shortening is possible by increasing the clamping force by adjusting the outer diameter of the ferrule 12 and the inner diameter of the holder 20.

A rear end 20b of the holder 20 is positioned rearward of the rear end 12b of the ferrule 12. The holder 20 surrounds a portion of the optical fiber 14 and a portion of the protective member 16 around the axes. The optical fiber 14 and the protective member 16 further extend outside the holder 20. In other words, the optical fiber 14 and the protective member 16 are drawn out rearward from the rear end 20b of the holder 20 in the state of being inserted through the holder 20 and the ferrule 12 having the tubular configurations.

The optical receptacle 10 further includes an elastic member 24 (a first elastic member). The elastic member 24 is filled into the through-hole 12t of the ferrule 12 and into the holder 20. The elastic member 24 fixedly bonds the optical fiber 14 and the protective member 16 to the ferrule 12 and the holder 20. The elastic member 24 includes, for example, a resin material such as an epoxy resin, etc. The elastic member 24 is, for example, a cured bonding agent.

It is sufficient for the elastic member 24 to enter at least a portion of the interior of the through-hole 12t and at least a portion of the interior of the holder 20. The entireties of the interiors of the through-hole 12t and the holder 20 may not be always be filled with the elastic member 24. For example, "filling" also includes the case where a void or the like is partially included.

An inner perimeter surface 20n of the holder 20 includes a first inner perimeter portion IS1 and a second inner perimeter portion IS2. The first inner perimeter portion IS1 engages the outer surface 12g of the ferrule 12. The second inner perimeter portion IS2 is positioned rearward of the first inner perimeter portion IS1, protrudes inward from the first inner perimeter portion IS1, and surrounds a portion of the optical fiber 14 and a portion of the protective member 16 around the axes.

The inner diameter of the portion of the first inner perimeter portion IS1 of the holder 20 is substantially the same as the outer diameter of the ferrule 12. On the other hand, the inner diameter of the portion of the second inner perimeter portion IS2 of the holder 20 is smaller than the outer diameter of the ferrule 12. Accordingly, the second inner perimeter portion IS2 is positioned rearward of the rear end 12b of the ferrule 12.

For example, the inner diameter of the portion of the second inner perimeter portion IS2 is set to a value that is larger than the outer diameter of the protective member 16 and smaller than the outer diameter of the ferrule 12. For example, the inner diameter of the portion of the second inner perimeter portion IS2 is smaller than the opening diameter on the rear end 12b side of the through-hole 12t that widens in the second region R2.

A gap SP in the axial direction is provided between the rear end 12b of the ferrule 12 and the second inner perimeter portion IS2. The elastic member 24 is filled also into the gap SP. For example, the distance in the axial direction of the gap SP is longer than the outer diameter of the optical fiber 14. For example, the distance in the axial direction of the gap SP is not less than about 0.125 mm and not more than about 0.2 mm. In other words, the distance in the axial direction of the gap SP is the distance in the axial direction between the second inner perimeter portion IS2 and the rear end 12b of the ferrule 12. In other words, the outer diameter of the optical fiber 14 is the length in a direction orthogonal to the axial direction of the optical fiber 14.

The holder 20 has a first rear end surface BS1 and a second rear end surface BS2. The second rear end surface BS2 is recessed frontward of the first rear end surface BS1 on the outer perimeter side of the first rear end surface BS1. In the example, the rear end 20b of the holder 20 is the first rear end surface BS1. For example, the first rear end surface BS1 has a ring configuration surrounding the opening end on the rear end 20b side of the holder 20 having the tubular configuration. For example, the second rear end surface BS2 has a ring configuration surrounding the first rear end surface BS1 in the state in which the holder 20 is viewed along the axial direction. The first rear end surface BS1 and the second rear end surface BS2 are, for example, planes orthogonal to the axial direction. As described above, the inner perimeter surface 20n of the holder 20 protrudes on the inner side at the rear end vicinity of the inner perimeter surface 20n. Thereby, the surface areas of the first rear end surface BS1 and the second rear end surface BS2 can be increased.

The holder 20 includes a chamfer portion 20c between the first rear end surface BS1 (the rear end surface) and the second inner perimeter portion IS2 (the inner perimeter surface 20n). In other words, the diameter of the opening on the rear end 20b side of the holder 20 widens toward the rear end 20b side. The chamfer portion 20c may be a so-called C-surface in which the corner between the first rear end surface BS1 and the second inner perimeter portion IS2 is polished into a linear configuration, or a so-called R-surface in which the corner between the first rear end surface BS1 and the second inner perimeter portion IS2 is rounded.

The elastic member 24 includes a protrusion 24p that protrudes outside the holder 20 on the rear end 20b side of the holder 20 and covers the corner portion between the rear end 20b of the holder 20 and the outer surface of the protective member 16. For example, the outer surface of the protrusion 24p is concave toward the corner portion side and has a concave curved-surface configuration smoothly connecting the rear end 20b of the holder 20 and the outer surface of the protective member 16.

The outer surface 12g of the ferrule 12 includes a first contact portion CP1 contacting the inner perimeter surface 20n of the holder 20. The outer surface 20g of the holder 20 includes a second contact portion CP2 contacting the inner perimeter surface of the housing 22. An intermediate point m2 in the axial direction of the second contact portion CP2 is positioned rearward of an intermediate point m1 in the axial direction of the first contact portion CP1.

In the optical receptacle 10 according to the embodiment as described above, because the ferrule 12 and at least a portion of the sleeve 18 are housed inside the housing 22, the lengths of the ferrule 12 and/or the housing 22 can be shortened compared to a configuration in which the rear end 12b of the ferrule 12 protrudes rearward of the housing 22. Also, the holder 20 holds the portion of the outer surface 12g of the ferrule 12 rearward of the first region R1. Thereby, for example, an undesirable concentration of an external force in the optical fiber 14 at the boundary portion between the first region R1 holding the optical fiber 14 and the second region R2 not holding the optical fiber 14 can be suppressed even in the case where the diameter of the ferrule 12 contracts due to the press-fitting of the holder 20 into the housing 22 and the press-fitting of the ferrule 12 into the holder 20. Accordingly, the optical receptacle 10 in which downsizing is possible can be provided without causing the decrease of the reliability.

Also, in the optical receptacle 10, the front end 16a of the protective member 16 is positioned inside the second region R2 of the through-hole 12t. Thereby, the length of the portion of the optical fiber 14 protruding from the protective member 16 can be shortened as much as possible. For example, the flexing of the optical fiber 14 can be suppressed; and the optical fiber 14 can be inserted easily into the through-hole 12t of the ferrule 12. For example, the manufacturability of the optical receptacle 10 can be improved.

In the optical receptacle 10, the holder 20 holds the rear end 12b side of the ferrule 12 by press-fitting. Thereby, the holding force can be increased; and the ferrule 12 can be held appropriately by a simple configuration.

In the optical receptacle 10, the optical fiber 14 and the protective member 16 further extend outside the holder 20 and are fixedly bonded to the holder 20 by the elastic member 24. Thereby, deformation and/or tilting due to an external force of the portion of the optical fiber 14 protruding from the protective member 16 can be suppressed. Also, the protrusion from or the reverse retraction into the front end 12a of the ferrule 12 of the front end 14a of the optical fiber 14 due to the application of the external force can be suppressed.

In the optical receptacle 10, the elastic member 24 is filled also into the gap SP between the second inner perimeter portion IS2 and the rear end 12b of the ferrule 12. Thereby, the deformation and/or the positional shift of the front end portion of the optical fiber 14 due to the external force can be suppressed further.

In the optical receptacle 10, the holder 20 has the first rear end surface BS1 and the second rear end surface BS2. Thereby, for example, by using the first rear end surface BS1 as the receiving surface of the bonding agent used to form the elastic member 24, the undesirable flowing of the bonding agent to the second rear end surface BS2 can be suppressed. Then, the undesirable occurrence of positional shift between the holder 20 and the housing 22 can be suppressed by using the second rear end surface BS2 as the positional alignment surface when press-fitting the holder 20 into the housing 22 and by press-fitting into the housing 22 by pressing the second rear end surface BS2.

For example, in the case where the coating of the bonding agent and the positional alignment of the holder 20 are to be performed in the same plane, there is a possibility that the bonding agent may undesirably flow to the positional alignment surface; and the holder 20 may be undesirably press-fitted deeply into the housing 22 due to the amount of the cured bonding agent. By providing the first rear end surface BS1 and the second rear end surface BS2, such positional shift can be suppressed; and the positional precision between the holder 20 and the housing 22 can be increased.

Also, by providing the gap SP, the distance between the second rear end surface BS2 which is the positional alignment surface and the front end 12a of the ferrule 12 which is the PC-surface can be determined more accurately. For example, in the case where there is no gap SP and the second inner perimeter portion IS2 and the rear end 12b of the ferrule 12 contact each other, the length from the second rear end surface BS2 to the front end 12a of the ferrule 12 undesirably changes due to the final quality (the error, the fluctuation, etc.) of the total length dimension of the ferrule 12 and/or the thickness dimension of the holder 20. Conversely, by providing the gap SP as in the optical receptacle 10, the length from the second rear end surface BS2 to the front end 12a of the ferrule 12 can be determined more accurately without being dependent on the final quality of the parts. Thereby, an increase of the reliability and/or the productivity of the optical receptacle 10 can be realized.

In the case where the gap SP is not provided, there is a risk that the ferrule 12 may be fixed obliquely due to the final quality of the perpendicularity of the second inner perimeter portion IS2 and/or the rear end 12b of the ferrule 12, etc.; the ferrule 12 may be chipped; and the holder 20 may undesirably deform. By providing the gap SP in the optical receptacle 10, the oblique press-fitting of the ferrule 12, the damage and deformation of the parts, etc., can be suppressed regardless of the final quality of the parts.

The error of the total length dimension of the ferrule 12 is, for example, about ±0.05 mm (a range of 0.1 mm). The error of the thickness dimension of the holder 20 is, for example, about ±0.05 mm (a range of 0.1 mm). In such a case, it is favorable for the distance in the axial direction of the gap SP to be about 0.2 mm. Thus, the distance in the axial direction of the gap SP is set to be longer than the outer diameter of the optical fiber 14. The distance in the axial direction of the gap SP is set to be not less than about 0.125 mm and not more than about 0.2 mm. Thereby, the reliability and/or the productivity of the optical receptacle 10 can be increased further.

Also, the length where the protective member 16 is fixedly bonded can be longer by setting the length of the portion of the first rear end surface BS1 to be longer than the length necessary for the holder 20 to be held by the housing 22 (the length necessary for the press-fitting). Thereby, the deformation and/or the positional shift of the front end portion of the optical fiber 14 can be suppressed further.

In the optical receptacle 10, by providing the chamfer portion 20c between the rear end surface and the inner perimeter surface of the holder 20, the optical fiber 14 can be inserted easily into the holder 20; and the manufacturability can be improved. Also, when coating a bonding agent on the first rear end surface BS1, the chamfer portion 20c can be used as a bonding agent reservoir; and the undesirable flowing of the bonding agent to the second rear end surface BS2 (the positional alignment surface) can be suppressed further.

In the optical receptacle 10, the elastic member 24 includes the protrusion 24p. Thereby, the undesirable bending of the optical fiber 14 locally at the corner portion between the rear end 20b of the holder 20 and the outer surface of the protective member 16 when the load is applied by the external force can be suppressed. For example, the starting point of the bending of the optical fiber 14 can be distal to the boundary portion between the first region R1 and the second region R2.

In the optical receptacle 10, the housing 22 holds the holder 20 by press-fitting. Thereby, the holding force can be increased; and the holder 20 can be held appropriately by a simple configuration.

In the optical receptacle 10, the intermediate point m2 of the second contact portion CP2 of the holder 20 is positioned rearward of the intermediate point m1 of the first contact portion CP1 of the ferrule 12. Thereby, for example, even in the case where the holder 20 is press-fitted into the housing 22, etc., the clamping force due to the press-fitting can be dispersed over a wide region by the second contact portion CP2; and the undesirable concentration of the external force in the optical fiber 14 at the boundary portion between the first region R1 and the second region R2 can be suppressed further.

Figure 2A:
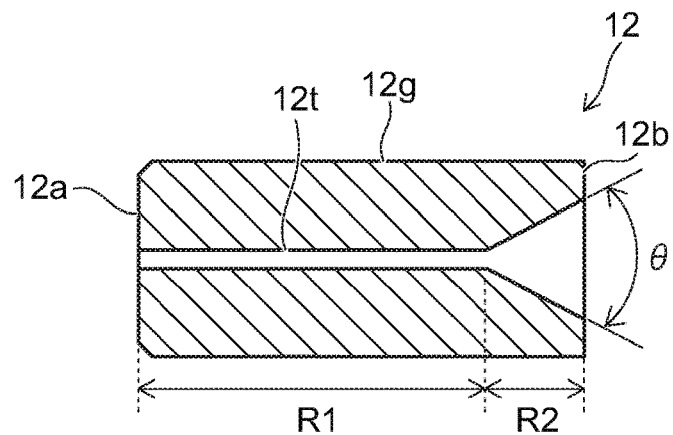
FIG. 2A to FIG. 2C are cross-sectional views illustrating specific examples of the ferrule according to the first embodiment.
Figure 2B:
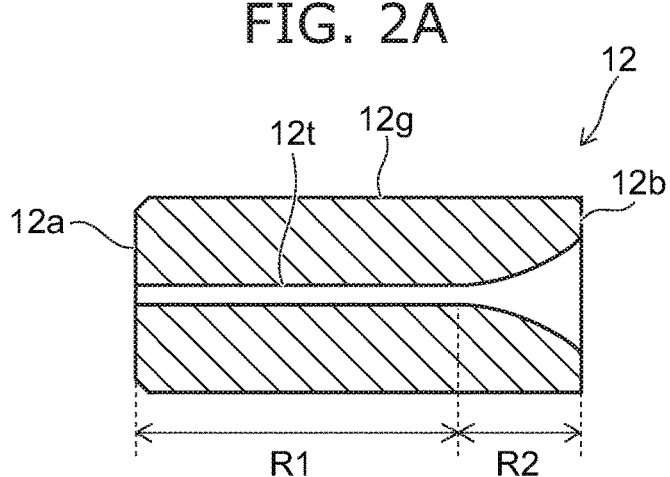
Figure 2C:
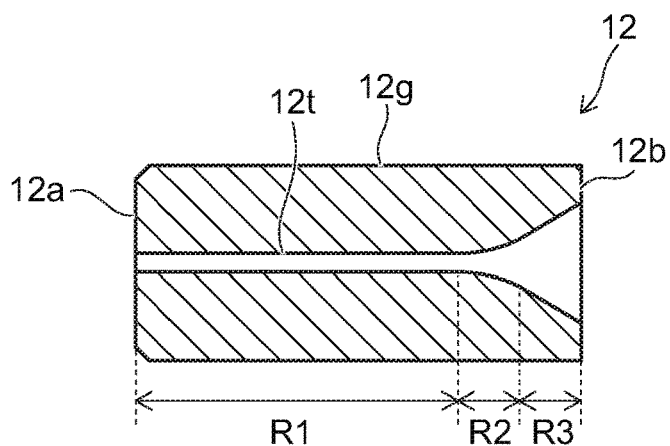

FIG. 2A to FIG. 2C are cross-sectional views illustrating specific examples of the ferrule according to the first embodiment.

In the example as illustrated in FIG. 2A, the change of the diameter (the width in the orthogonal direction) of the through-hole 12t in the second region R2 has a linear configuration. The inner perimeter surface of the second region R2 of the through-hole 12t has a linear configuration in a cross section parallel to the central axis of the through-hole 12t (the cross section illustrated in FIG. 2A). Thus, the change of the diameter in the second region R2 has, for example, a linear configuration. A spread angle $\theta$ of the diameter of the through-hole 12t in the second region R2 is, for example, not less than 60° and not more than 90°. For example, the spread angle $\theta$ is set to 60°; and in the case where the diameter of the through-hole 12t in the first region R1 is set to 0.8 mm, the length in the axial direction of the second region R2 is about 0.6 mm.

In such a case, when the inner diameter of the ferrule 12 contracts due to the press-fitting, etc., stress is applied to the portion of the optical fiber 14 inserted into the through-hole 12t in the first region R1; but the stress due to the contraction substantially is not applied to the portion in the second region R2. Therefore, the difference between the stresses applied to the optical fiber 14 at the boundary portion between the first region R1 and the second region R2 is large.

Accordingly, in the case where the ferrule 12 illustrated in FIG. 2A is used, as recited above, the holder 20 is set to hold the portion of the outer surface 12g of the ferrule 12 rearward of the first region R1. Thereby, the contraction of the diameter at the portion in the first region R1 can be suppressed; and the stress difference that is generated at the boundary portion between the first region R1 and the second region R2 can be relaxed. The undesirable concentration of the external force in the optical fiber 14 at the boundary portion between the first region R1 and the second region R2 can be suppressed.

In the example as illustrated in FIG. 2B, the change of the diameter of the through-hole 12t in the second region R2 has a curved configuration that is convex toward the central axis side of the through-hole 12t. The inner perimeter surface of the second region R2 of the through-hole 12t has a convex curved configuration in a cross section parallel to the central axis of the through-hole 12t. For example, the inner perimeter surface of the second region R2 of the through-hole 12t smoothly connects the inner perimeter surface of the first region R1 of the through-hole 12t and the rear end surface of the ferrule 12. Thus, for example, the change of the diameter in the second region R2 may have a convex curved configuration.

In such a case, the stress that is applied to the optical fiber 14 due to the contraction of the inner diameter of the ferrule 12 changes gradually according to the curved surface of the inner perimeter surface of the second region R2. In other words, an abrupt change of the stress applied to the optical fiber 14 at the boundary portion between the first region R1 and the second region R2 can be suppressed; and the stress difference at the boundary portion between the first region R1 and the second region R2 can be relaxed. Accordingly, the undesirable concentration of the external force in the optical fiber 14 at the boundary portion between the first region R1 and the second region R2 can be suppressed further.

In the example as illustrated in FIG. 2C, the through-hole 12t of the ferrule 12 further includes a third region R3 disposed rearward of the second region R2. The third region R3 is continuous with the second region R2. Also, in the example, the third region R3 is continuous with the rear end 12b of the ferrule 12.

Similarly to the example of FIG. 2B, the change of the diameter of the through-hole 12t in the second region R2 has a curved configuration that is convex toward the central axis side of the through-hole 12t. On the other hand, the change of the diameter of the through-hole 12t in the third region R3 has a linear configuration. In the third region R3, the diameter of the through-hole 12t increases continuously in a linear configuration toward the rear end 12b side. In other words, in the example, the configuration of the second region R2 is a configuration in which the intersection portion between the first region R1 and the third region R3 having the linear configurations is rounded.

Thus, in the through-hole 12t, the third region R3 where the diameter changes in the linear configuration may be further provided rearward of the second region R2 where the diameter changes in the convex curved configuration. Even in such a case, similarly to the example of FIG. 2B, the abrupt change of the stress applied to the optical fiber 14 at the boundary portion between the first region R1 and the second region R2 can be suppressed; and the stress difference at the boundary portion between the first region R1 and the second region R2 can be relaxed. The undesirable concentration of the external force in the optical fiber 14 at the boundary portion between the first region R1 and the second region R2 can be suppressed further. It is sufficient for a region where the diameter changes in a convex curved configuration to be provided at least directly after the first region R1.

Also, in the case where the third region R3 is provided, the front end 16a of the protective member 16 may be positioned inside the third region R3 of the through-hole 12t. Even in such a case, similarly to the case where the front end 16a is positioned in the second region R2, the length of the portion of the optical fiber 14 protruding from the protective member 16 can be shortened as much as possible. The flexing of the optical fiber 14 can be suppressed; and the optical fiber 14 can be inserted easily into the through-hole 12t of the ferrule 12. The manufacturability of the optical receptacle 10 can be improved.

In the case where the ferrule 12 includes a ceramic, the configurations of the through-holes 12t of the examples illustrated in FIG. 2A to FIG. 2C can be formed by, for example, inserting pin-shaped molds corresponding to the configurations of the through-holes 12t into block-shaped ceramics before firing.

FIG. 3 is a cross-sectional view illustrating a modification of the pigtail-type optical receptacle according to the first embodiment.

In the optical receptacle 10a as illustrated in FIG. 3, the holder 20 holds the portion of the outer surface 12g of the ferrule 12 rearward of the first region R1 and further holds a portion of the outer surface 12g opposing the first region R1. Components that are substantially the same functionally and configurationally as those of the embodiment recited above are marked with the same reference numerals; and a detailed description is omitted.

For example, as illustrated in FIG. 2B and FIG. 2C, in the case where the change of the diameter of the through-hole 12t in the second region R2 has a convex curved configuration, the stress difference at the boundary portion between the first region R1 and the second region R2 can be relaxed appropriately even by only the configuration of the through-hole 12t. Accordingly, in such a case, the holder 20 may further hold the portion opposing the first region R1. In the optical receptacle 10a as well, downsizing is possible without causing the decrease of the reliability.

However, the ferrule 12 in which the diameter of the through-hole 12t changes in the convex curved configuration may be used; and only the portion of the ferrule 12 rearward of the first region R1 may be held by the holder 20. Thereby, the stress difference at the boundary portion between the first region R1 and the second region R2 can be relaxed more appropriately. The undesirable concentration of the external force in the optical fiber 14 at the boundary portion between the first region R1 and the second region R2 can be suppressed further.

Figure 4:
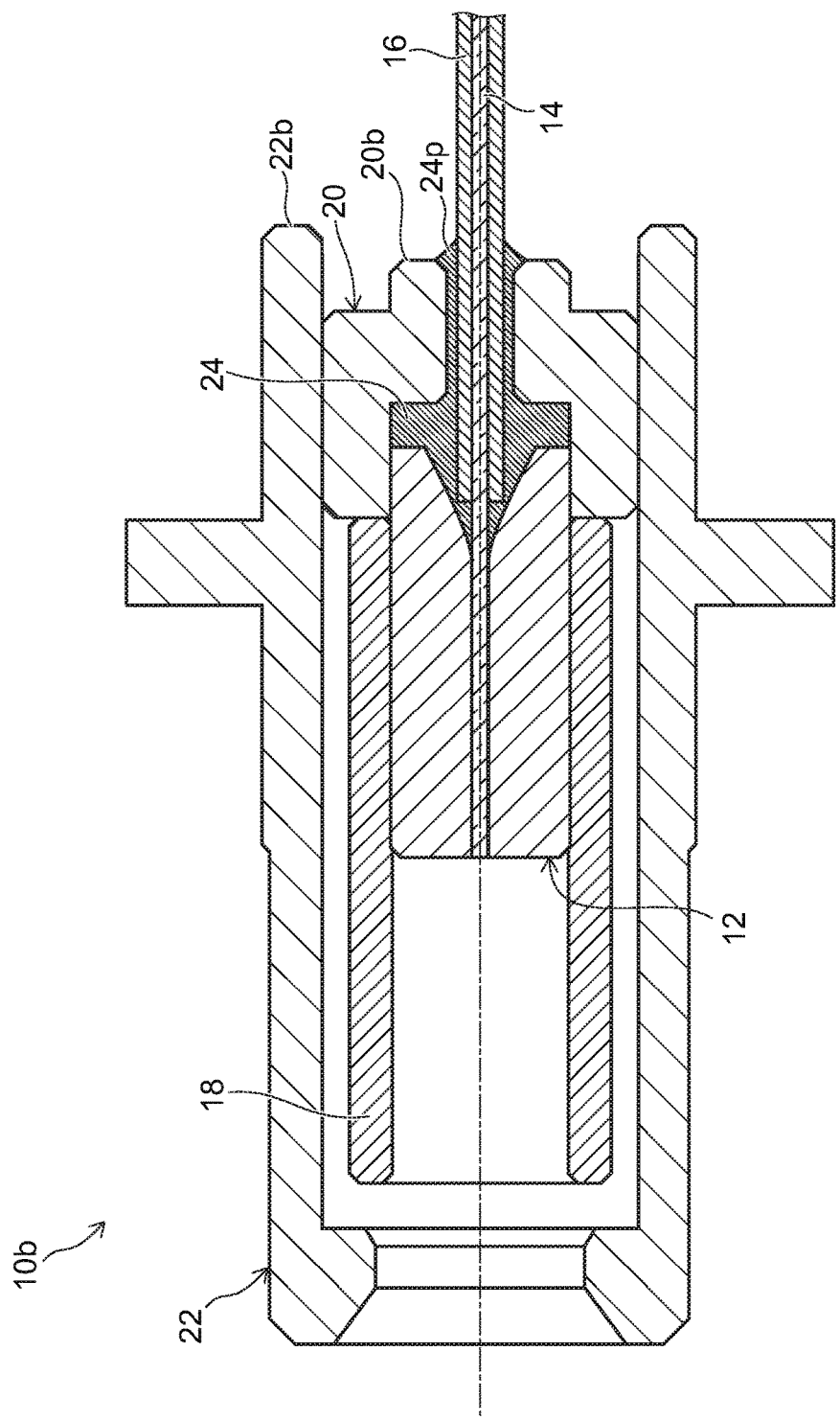
FIG. 4 is a cross-sectional view illustrating a modification of the pigtail-type optical receptacle according to the first embodiment.

FIG. 4 is a cross-sectional view illustrating a modification of the pigtail-type optical receptacle according to the first embodiment.

In the optical receptacle 10b as illustrated in FIG. 4, a rear end 22b of the housing 22 is positioned rearward of the rear end 20b of the holder 20 and the protrusion 24p of the elastic member 24. In other words, in the optical receptacle 10b, the housing 22 further covers the holder 20 around the axis and further covers the protrusion 24p of the elastic member 24 around the axis.

In the optical receptacle 10b, for example, the protrusion 24p of the elastic member 24 can be protected by the housing 22. The application of an external force to the protrusion 24p can be suppressed. The concentration of the external force at the boundary portion between the first region R1 and the second region R2 of the optical fiber 14 can be suppressed further. The optical fiber 14 can be protected more appropriately from the external force, etc.

Second Embodiment

Figure 5:
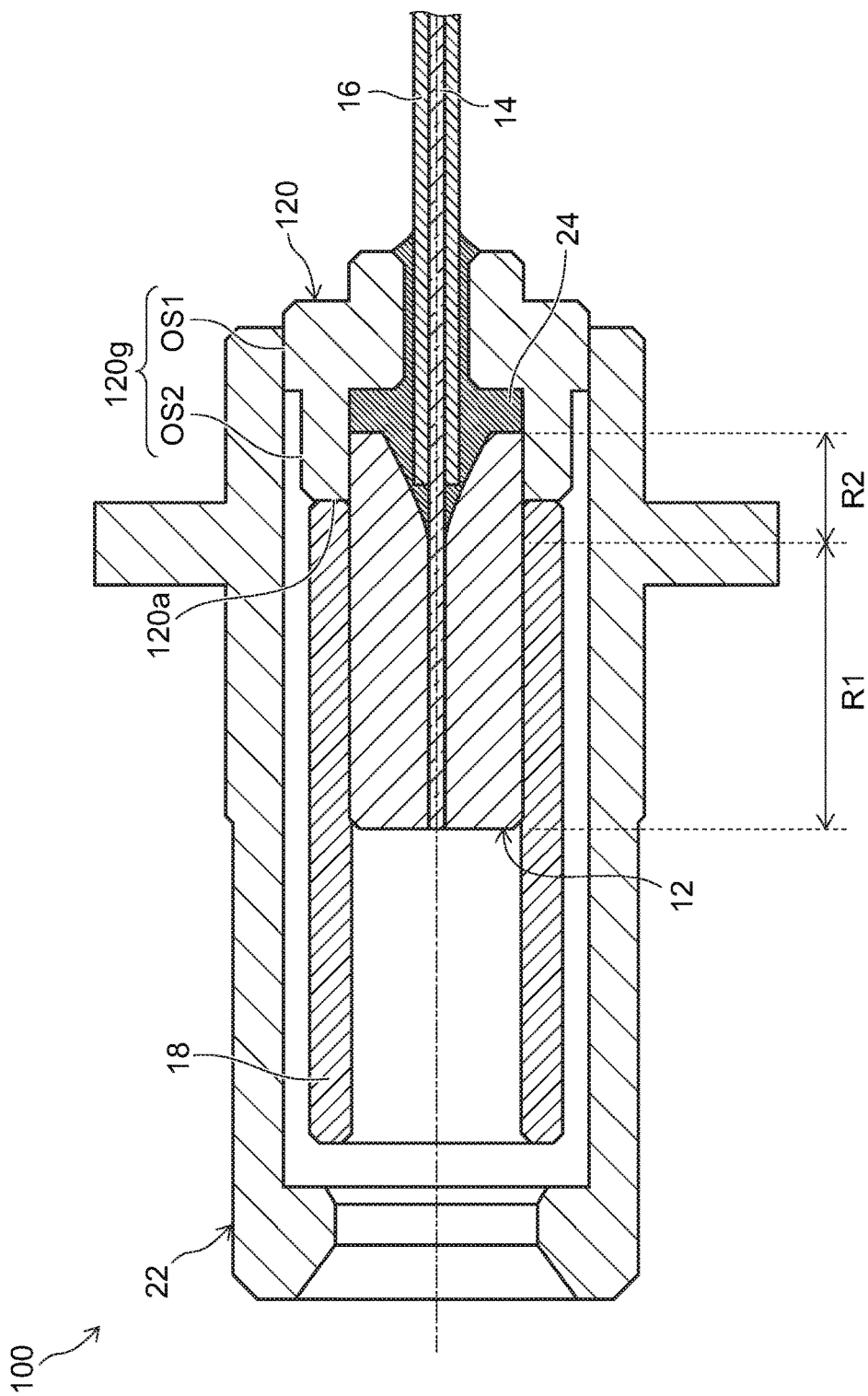
FIG. 5 is a cross-sectional view illustrating a pigtail-type optical receptacle according to a second embodiment.

FIG. 5 is a cross-sectional view illustrating a pigtail-type optical receptacle according to a second embodiment.

In the optical receptacle 100 as illustrated in FIG. 5, an outer surface 120g of a holder 120 includes a first outer perimeter portion OS1 and a second outer perimeter portion OS2.

The first outer perimeter portion OS1 is held by the housing 22. The outer diameter of the first outer perimeter portion OS1 of the holder 120 is substantially the same as the inner diameter of the housing 22. For example, the holder 120 is held by the housing 22 by press-fitting the portion of the first outer perimeter portion OS1 into the housing 22.

The second outer perimeter portion OS2 is provided at the front end portion of the holder 120. For example, the second outer perimeter portion OS2 is provided frontward of the first outer perimeter portion OS1, is continuous with the first outer perimeter portion OS1, and is continuous with a front end 120a of the holder 120. The second outer perimeter portion OS2 is recessed inward from the first outer perimeter portion OS1. The outer diameter of the second outer perimeter portion OS2 of the holder 120 is smaller than the outer diameter of the first outer perimeter portion OS1. The first outer perimeter portion OS1 is positioned rearward of the first region R1. Accordingly, the housing 22 engages the outer surface 120g of the holder 120 rearward of the first region R1.

Thus, in the optical receptacle 100, by setting the outer diameter of the front end portion of the holder 120 to be small, the portion of the holder 120 held by the housing 22 can be shifted rearward. Thereby, the undesirable concentration of the external force in the optical fiber 14 at the boundary portion between the first region R1 and the second region R2 can be suppressed further.

Also, in the optical receptacle 100, the holder 120 holds only the portion of the ferrule 12 rearward of the first region R1. Thereby, the undesirable concentration of the external force in the optical fiber 14 at the boundary portion between the first region R1 and the second region R2 can be suppressed further.

Further, in the optical receptacle 100, the holder 120 holds the ferrule 12 only at the portion of the second outer perimeter portion OS2. In other words, the periphery of the ferrule 12 is not press-fitted into the housing 22. Thereby, for example, the undesirable transfer, to the boundary portion between the first region R1 and the second region R2 of the optical fiber 14 via the holder 120, of the clamping force due to the press-fitting of the holder 120 into the housing 22 can be suppressed. Accordingly, the undesirable concentration of the external force in the optical fiber 14 at the boundary portion between the first region R1 and the second region R2 can be suppressed further.

Figure 6:
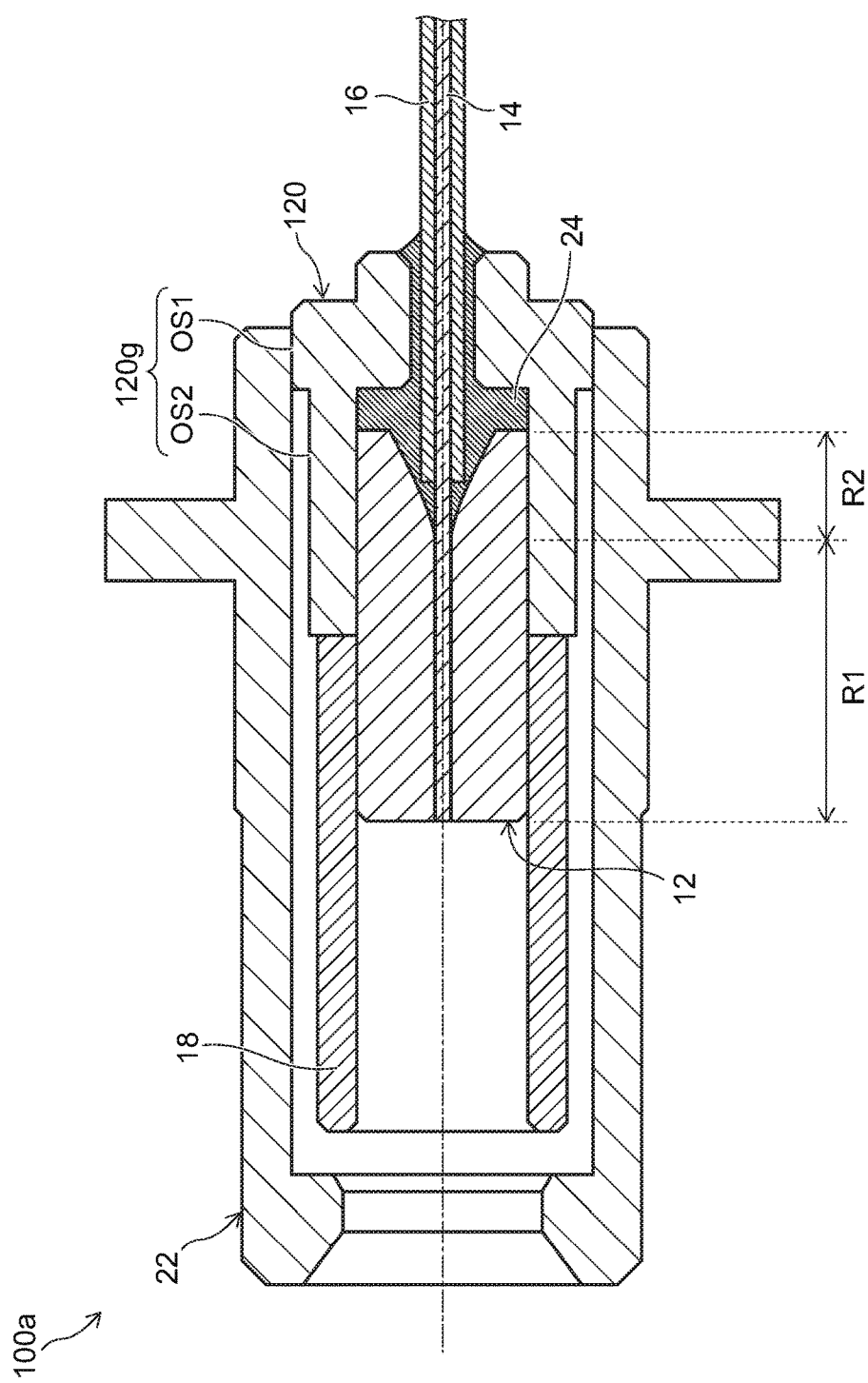
FIG. 6 is a cross-sectional view illustrating a modification of the pigtail-type optical receptacle according to the second embodiment.

FIG. 6 is a cross-sectional view illustrating a modification of the pigtail-type optical receptacle according to the second embodiment.

In the optical receptacle 100a as illustrated in FIG. 6, the holder 120 holds the portion of the outer surface 12g of the ferrule 12 rearward of the first region R1 and further holds the portion of the outer surface 12g opposing the first region R1. In the optical receptacle 100a, the first outer perimeter portion OS1 of the holder 120 is positioned rearward of the first region R1.

Thus, in the case where the first outer perimeter portion OS1 and the second outer perimeter portion OS2 are provided in the holder 120, it is sufficient for at least the first outer perimeter portion OS1 to be positioned rearward of the first region R1; and the holder 120 may further hold the portion of the ferrule 12 opposing the first region R1.

In other words, it is sufficient for at least the periphery of the boundary portion between the first region R1 and the second region R2 not to be press-fitted into the housing 22. Even in such a case, the undesirable transfer, to the boundary portion between the first region R1 and the second region R2 of the optical fiber 14 via the holder 120, of the clamping force due to the press-fitting of the holder 120 into the housing 22 can be suppressed.

However, as illustrated in FIG. 5, the first outer perimeter portion OS1 and the second outer perimeter portion OS2 may be provided in the holder 120; and only the portion of the ferrule 12 rearward of the first region R1 may be held by the holder 120. Thereby, the undesirable transfer to the optical fiber 14 of the clamping force due to the press-fitting can be suppressed further. The undesirable concentration of the external force in the optical fiber 14 at the boundary portion between the first region R1 and the second region R2 can be suppressed more appropriately.

Figure 7:
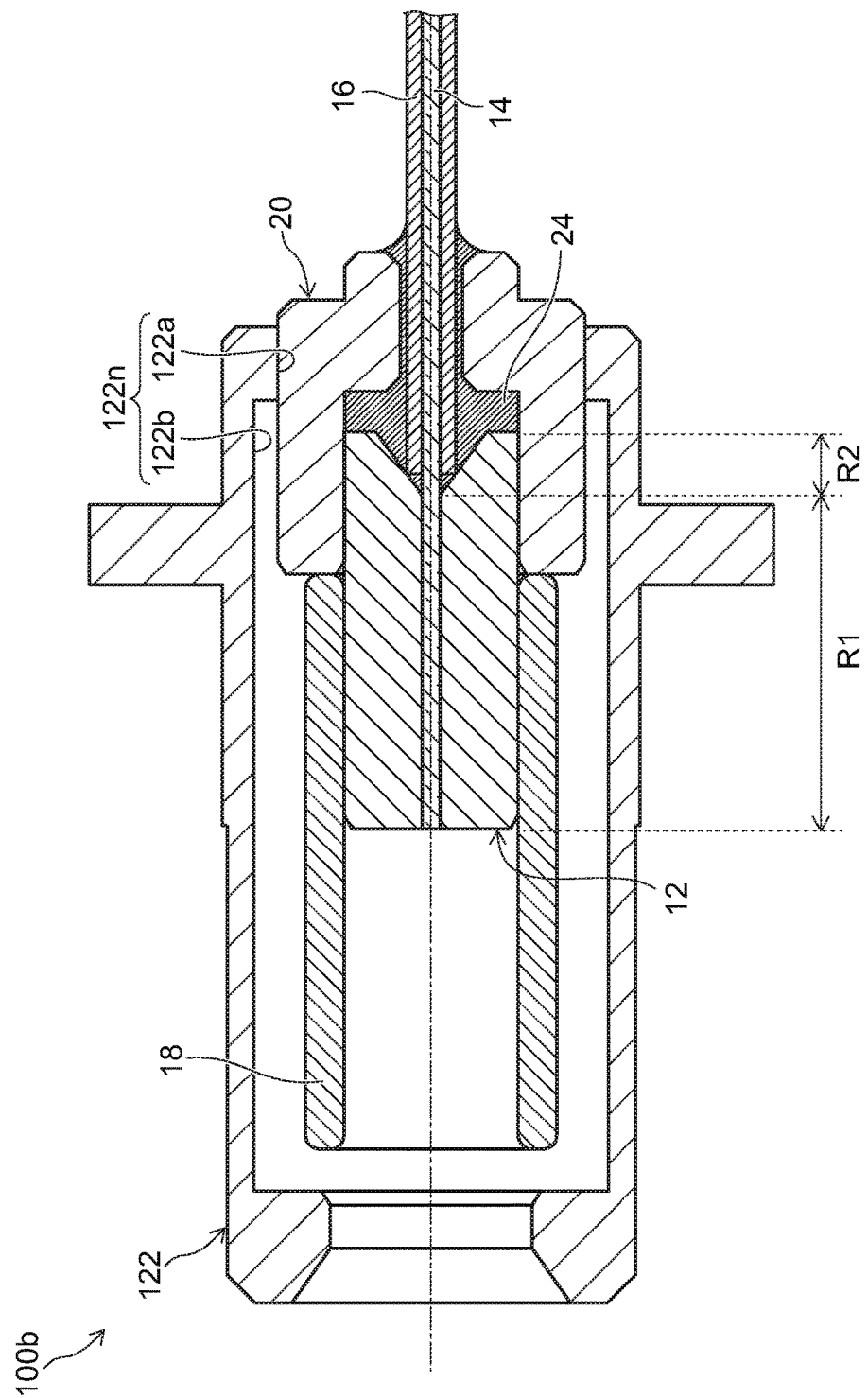
FIG. 7 is a cross-sectional view illustrating a modification of the pigtail-type optical receptacle according to the second embodiment.

FIG. 7 is a cross-sectional view illustrating a modification of the pigtail-type optical receptacle according to the second embodiment.

In the optical receptacle 100b as illustrated in FIG. 7, an inner surface 122n of a housing 122 includes a first inner perimeter portion 122a and a second inner perimeter portion 122b. The first inner perimeter portion 122a engages the outer surface 20g of the holder 20. The inner diameter of the first inner perimeter portion 122a is substantially the same as the outer diameter of the holder 20. For example, the housing 122 is mounted to the holder 20 by press-fitting the first inner perimeter portion 122a into the holder 20. For example, the first inner perimeter portion 122a is formed in a ring configuration around the entire perimeter of the inner surface 122n of the housing 122. For example, multiple first inner perimeter portions 122a may be provided to be arranged discretely along the inner perimeter of the housing 122.

The second inner perimeter portion 122b is provided frontward of the first inner perimeter portion 122a. The second inner perimeter portion 122b widens outward from the first inner perimeter portion 122a. The inner diameter of the second inner perimeter portion 122b is larger than the inner diameter of the first inner perimeter portion 122a.

The first inner perimeter portion 122a is positioned rearward of the first region R1. Accordingly, the housing 122 engages the outer surface 20g of the holder 20 rearward of the first region R1.

Thus, in the optical receptacle 100b, by setting the inner diameter of the second inner perimeter portion 122b of the housing 122 to be large, the first inner perimeter portion 122a where the holder 20 is held by the housing 122 can be shifted rearward. Thereby, similarly to the optical receptacle 100 described in reference to FIG. 5, etc., the undesirable concentration of the external force in the optical fiber 14 at the boundary portion between the first region R1 and the second region R2 can be suppressed.

In FIG. 7, the holder 20 holds the first region R1 and the second region R2. Even in the case where the housing 122 is used, the holder 20 may hold only the portion of the ferrule 12 rearward of the first region R1. Thereby, the undesirable transfer to the optical fiber 14 of the clamping force due to the press-fitting can be suppressed further.

Figure 8A:
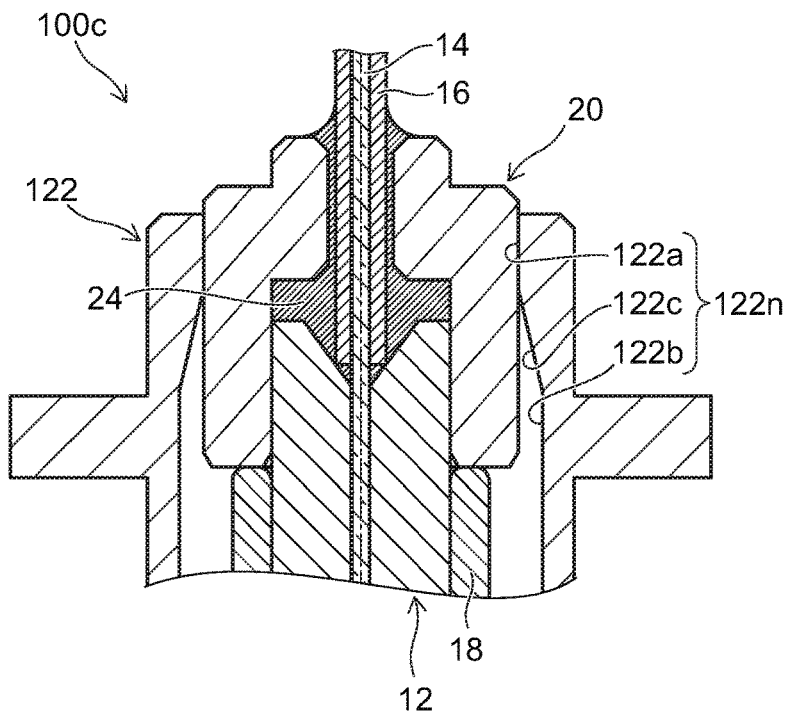
FIG. 8A and FIG. 8B are cross-sectional views illustrating modifications of the pigtail-type optical receptacle according to the second embodiment.
Figure 8B:
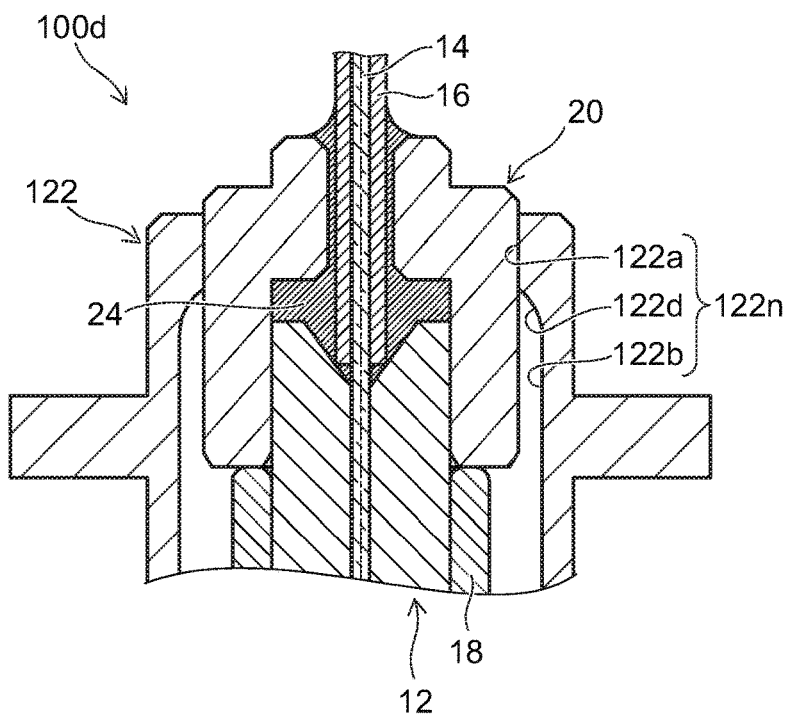

FIG. 8A and FIG. 8B are cross-sectional views illustrating modifications of the pigtail-type optical receptacle according to the second embodiment.

In the housing 122 of an optical receptacle 100c as illustrated in FIG. 8A, the second inner perimeter portion 122b is connected to the first inner perimeter portion 122a via a tilted surface 122c. In the housing 122 of an optical receptacle 100d as illustrated in FIG. 8B, the second inner perimeter portion 122b is connected to the first inner perimeter portion 122a via a curved surface 122d. For example, the curved surface 122d has a concave curved-surface configuration that is smoothly continuous with the second inner perimeter portion 122b.

Thus, it is favorable for the first inner perimeter portion 122a and the second inner perimeter portion 122b to be connected smoothly by the tilted surface 122c or the curved surface 122d. Thereby, the housing 122 can be formed easily even in the case where the first inner perimeter portion 122a and the second inner perimeter portion 122b are provided in the inner surface 122n of the housing 122. For example, the manufacturability of the housing 122 can be improved; and the manufacturing cost of the optical receptacles 100c and 100d can be suppressed.

Third Embodiment

Figure 9:
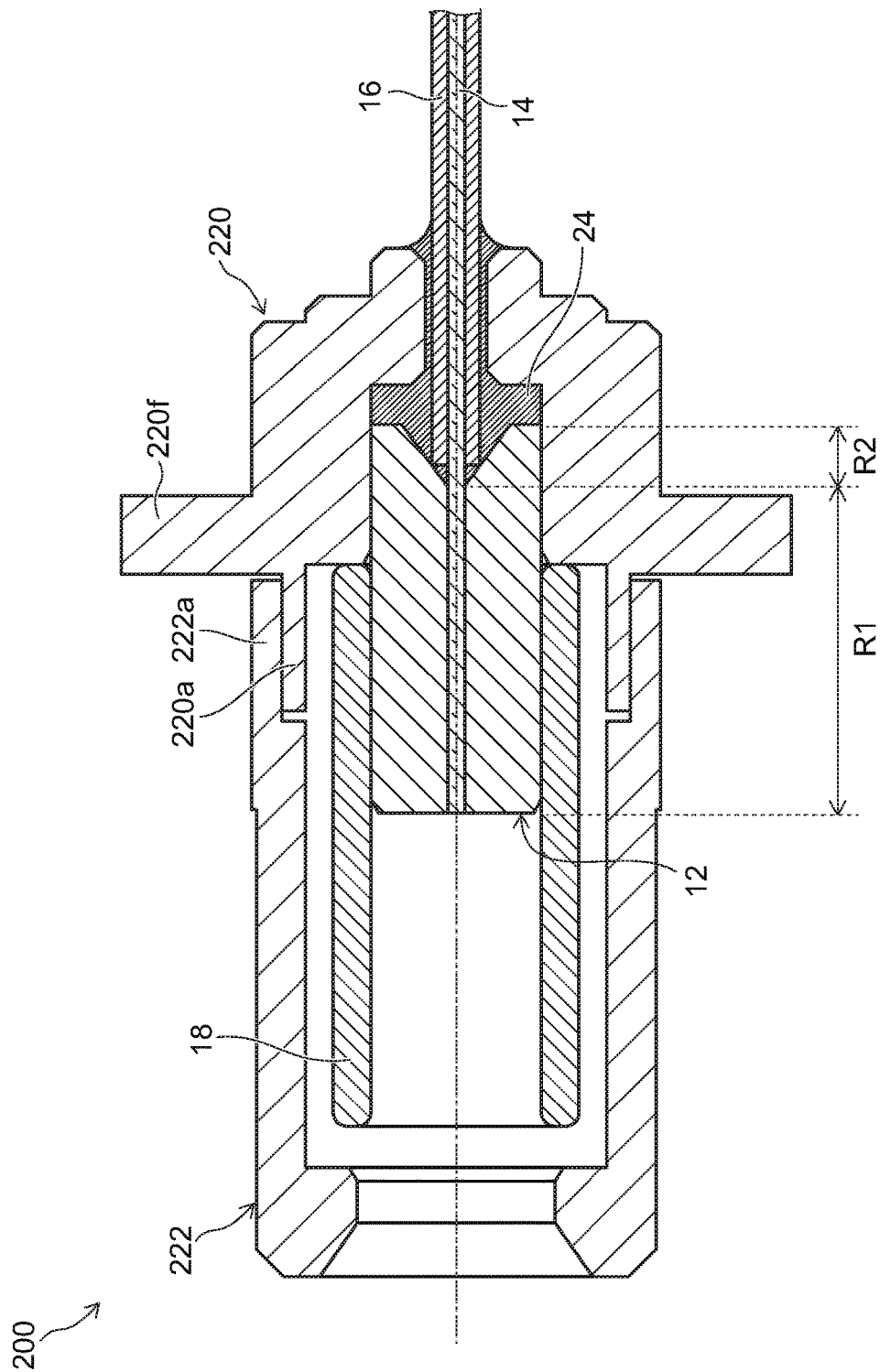
FIG. 9 is a cross-sectional view illustrating a pigtail-type optical receptacle according to a third embodiment.

FIG. 9 is a cross-sectional view illustrating a pigtail-type optical receptacle according to a third embodiment.

In the optical receptacle 200 as illustrated in FIG. 9, a housing 222 is mounted on the front end side of a holder 220.

The holder 220 includes a mounting portion 220a for mounting the housing 222. The mounting portion 220a is provided at the front end portion of the holder 220. The housing 222 includes a mounted portion 222a where the housing 222 is mounted to the mounting portion 220a. The mounted portion 222a is provided at the rear end portion of the housing 222. The mounting portion 220a and the mounted portion 222a have tubular configurations. The mounted portion 222a engages the outer side of the mounting portion 220a. Thereby, the housing 222 is mounted on the front end side of the holder 220.

The holder 220 includes a flange 220f. The flange 220f is provided frontward of the second region R2. The front end of the flange 220f is positioned frontward of the front end of the second region R2. Also, the flange 220f protrudes outward from the housing 222 mounted to the mounting portion 220a. For example, the flange 220f is used in the positional alignment of the optical receptacle 200.

The mounting portion 220a is provided frontward of the flange 220f. Accordingly, the housing 222 is mounted to the holder 220 frontward of the flange 220f.

In the optical receptacle 200, the flange 220f that protrudes outward from the housing 222 is included; and the housing 222 is mounted to the holder 220 frontward of the flange 220f. Thereby, for example, compared to the case where the housing 222 is mounted to the holder 220 on the rear end side of the flange 220f, the lengths of the ferrule 12, the holder 220, and the housing 222 can be shortened while suppressing the undesirable concentration of the external force caused by mounting the housing 222, in the optical fiber 14 at the boundary portion between the first region R1 holding the optical fiber 14 and the second region R2 not holding the optical fiber 14. Accordingly, a pigtail-type optical receptacle 200 that can be downsized without causing the decrease of the reliability can be provided.

In FIG. 9, the holder 220 holds the first region R1 and the second region R2. Even in a configuration in which the housing 222 is mounted, the holder 220 may hold only the portion of the ferrule 12 rearward of the first region R1. Thereby, the undesirable transfer to the optical fiber 14 of the clamping force due to the press-fitting can be suppressed further.

Figure 10A:
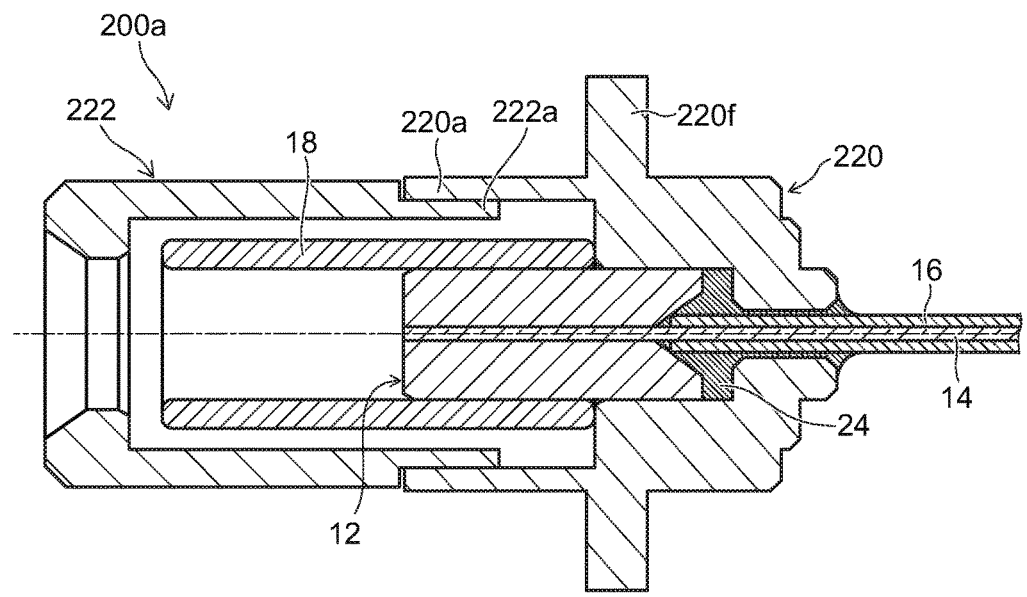
FIG. 10A and FIG. 10B are cross-sectional views illustrating modifications of the pigtail-type optical receptacle according to the third embodiment.
Figure 10B:
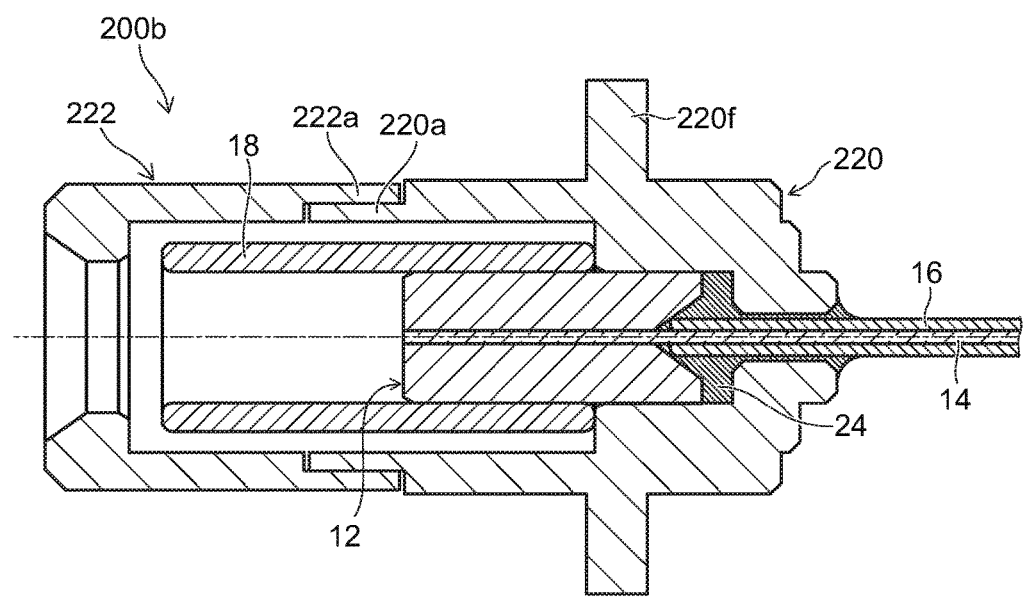

FIG. 10A and FIG. 10B are cross-sectional views illustrating modifications of the pigtail-type optical receptacle according to the third embodiment.

In an optical receptacle 200a as illustrated in FIG. 10A, the housing 222 is mounted on the front end side of the holder 220 by the mounted portion 222a engaging the inner side of the mounting portion 220a. Thus, the mounted portion 222a may engage the outer side of the mounting portion 220a or may engage the inner side of the mounting portion 220a. The configurations of the mounting portion 220a and the mounted portion 222a are not limited to those recited above; and any configuration in which the housing 222 is mountable to the front end side of the holder 220 may be used.

In an optical receptacle 200b as illustrated in FIG. 10B, the mounting portion 220a extends further frontward compared to the mounting portion 220a of the optical receptacle 200 shown in FIG. 9. Thus, the position of the mounting portion 220a (the mounting position of the housing 222) may be any position frontward of the flange 220f.

Fourth Embodiment

Figure 11:
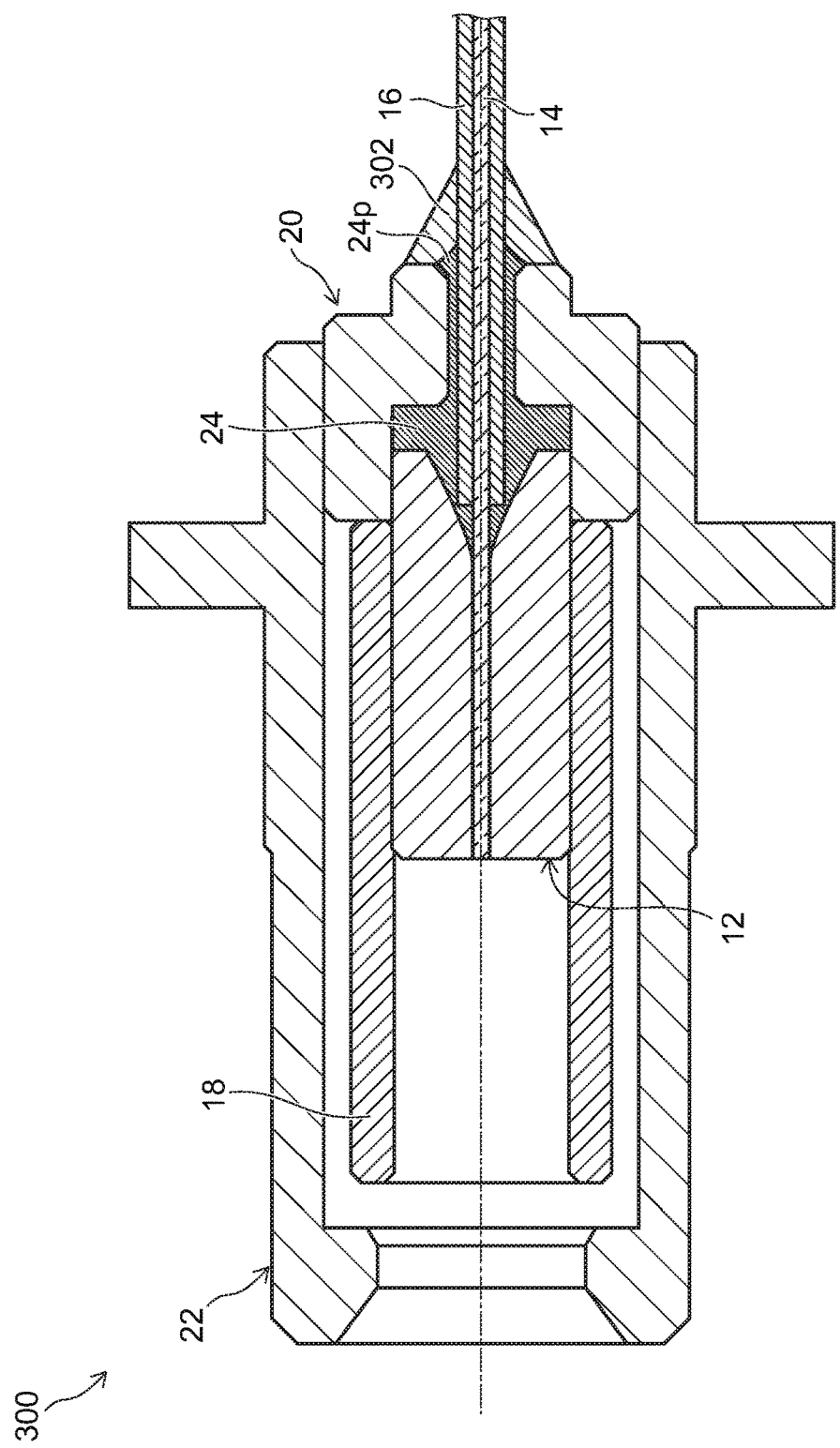
FIG. 11 is a cross-sectional view illustrating a pigtail-type optical receptacle according to a fourth embodiment.

FIG. 11 is a cross-sectional view illustrating a pigtail-type optical receptacle according to a fourth embodiment. As illustrated in FIG. 11, the optical receptacle 300 includes an elastic member 302 (a second elastic member).

Other than the elastic member 302, the configuration of the optical receptacle 300 is similar to the configuration of the optical receptacle 10 of the first embodiment; and a detailed description is therefore omitted. Other than the elastic member 302, the configuration of the optical receptacle 300 is not limited to the configuration of the optical receptacle 10 and may be similar to any of the optical receptacles 10a, 10b, 100, 100a to 100d, 200, 200a, and 200b described in the embodiments recited above.

Figure 12:
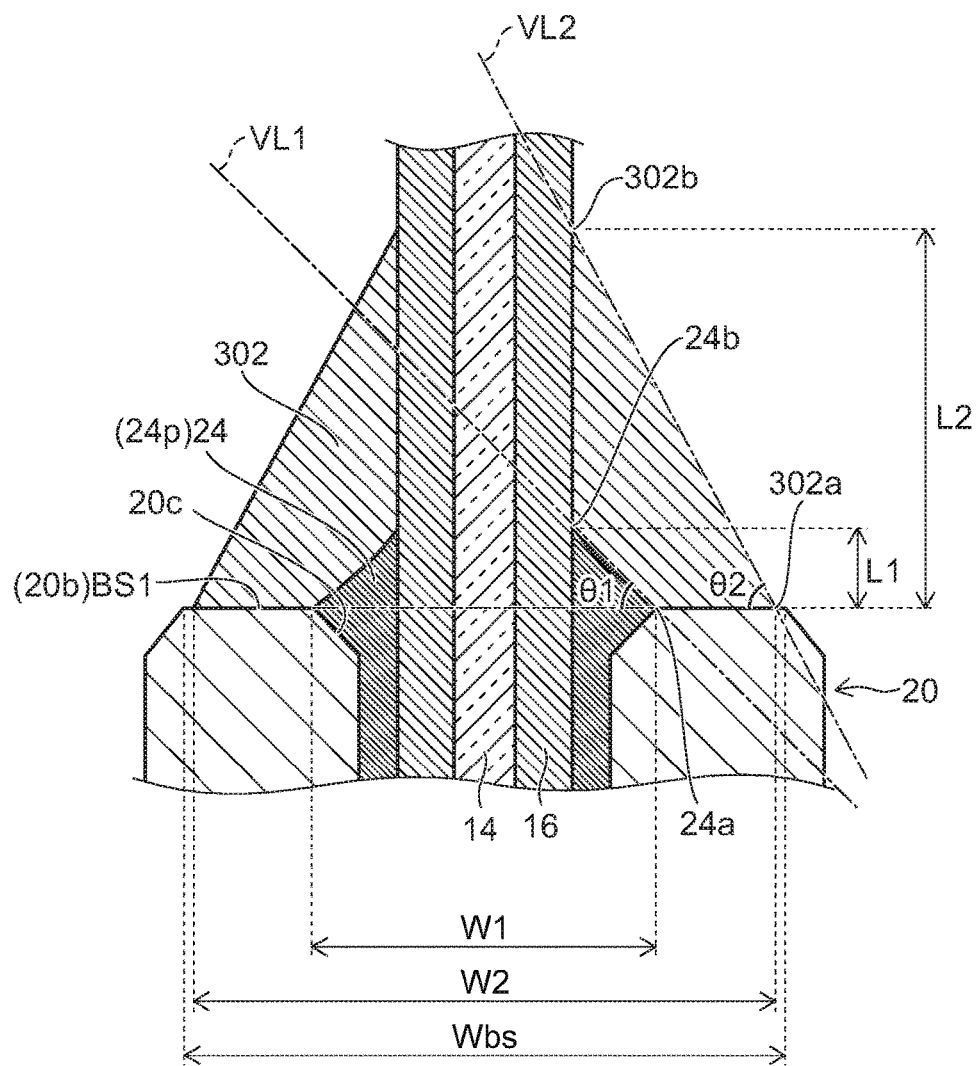
FIG. 12 is a partial cross-sectional view illustrating an enlarged portion of the pigtail-type optical receptacle according to the fourth embodiment.

FIG. 12 is a partial cross-sectional view illustrating an enlarged portion of the pigtail-type optical receptacle according to the fourth embodiment.

As illustrated in FIG. 11 and FIG. 12, the elastic member 302 covers the corner portion between the rear end 20b of the holder 20 and the outer surface of the protective member 16. In the case where the elastic member 24 includes the protrusion 24p, the elastic member 302 covers the protrusion 24p. For example, the elastic member 302 covers the entire outer surface of the protrusion 24p. In other words, the elastic member 302 covers the boundary portion between the elastic member 24 and the protective member 16.

The hardness of the elastic member 302 is lower than the hardness of the elastic member 24. In other words, the elastic modulus of the elastic member 302 is smaller than the elastic modulus of the elastic member 24. The hardness of the elastic member 24 is higher than the hardness of the protective member 16. The hardness of the elastic member 302 is, for example, about the same as the hardness of the protective member 16. The hardness of the elastic member 302 is, for example, not less than 0.8 times and not more than 1.2 times the hardness of the protective member 16. The hardness of the protective member 16 is, for example, about Shore D20-30. In such a case, similarly, the hardness of the elastic member 302 is about Shore D20-30.

As described above, the protective member 16 includes a resin material such as a polyester elastomer, an acrylate resin, etc. As described above, the elastic member 24 includes a resin material such as an epoxy resin, etc. The elastic member 302 includes, for example, a resin material such as a polyester resin, an acrylic resin, a silicone resin, etc. The elastic member 24 and the elastic member 302 include, for example, a resin bonding agent. In such a case, the hardness of the elastic member 24 and the hardness of the elastic member 302 are hardnesses after the curing of the bonding agent (after completely curing).

A width W2 of the elastic member 302 at the first rear end surface BS1 (the rear end surface) of the holder 20 is wider than a width W1 of the elastic member 24 at the first rear end surface BS1 of the holder 20. More specifically, the width W1 and the width W2 are widths (lengths) in a direction orthogonal to the axial direction. Also, the width W2 of the elastic member 302 in the direction orthogonal to the axial direction is narrower than a width Wbs of the first rear end surface BS1 in the direction orthogonal to the axial direction. The width W1 of the elastic member 24 is not more than the width (the outer diameter) of the chamfer portion 20c of the holder 20 in the direction orthogonal to the axial direction. In other words, the elastic member 24 does not spread outward from the chamfer portion 20c.

A length L2 in the axial direction of the elastic member 302 is longer than a length L1 in the axial direction of the protrusion 24p of the elastic member 24. For example, the length L2 in the axial direction of the elastic member 302 is not less than 2 times and not more than 4 times the length L1 in the axial direction of the protrusion 24p of the elastic member 24.

An average tilt angle θ2 between the outer surface of the elastic member 302 and the first rear end surface BS1 of the holder 20 is not less than an average tilt angle θ1 between the outer surface of the protrusion 24p and the first rear end surface BS1 of the holder 20.

Here, more specifically, the average tilt angle θ1 of the outer surface of the protrusion 24p is, for example, the minor angle of the angles between an imaginary line VL1 and directions orthogonal to the axial direction. The imaginary line VL1 is, for example, an imaginary line connecting a front end portion 24a of the outer surface of the protrusion 24p in a cross section parallel to the axial direction and a rear end portion 24b of the outer surface of the protrusion 24p in the cross section. Similarly, the average tilt angle θ2 of the outer surface of the elastic member 302 is, for example, the minor angle of the angles between an imaginary line VL2 and directions orthogonal to the axial direction. The imaginary line VL2 is, for example, an imaginary line connecting a front end portion 302a of the outer surface of the elastic member 302 in a cross section parallel to the axial direction and a rear end portion 302b of the outer surface of the elastic member 302 in the cross section.

In FIG. 12, the outer surface of the elastic member 302 and the outer surface of the protrusion 24p are illustrated as tilted surfaces having linear configurations for convenience. The outer surface of the elastic member 302 and the outer surface of the protrusion 24p are not limited thereto and may have, for example, a convex curved-surface configuration, a concave curved-surface configuration, etc. The configuration of the outer surface of the elastic member 302 and the configuration of the outer surface of the protrusion 24p may be any configuration.

When bending the optical fiber 14 in handling, etc., stress is applied easily to the optical fiber 14 at the base portion of the optical fiber 14 protruding from the holder 20 (the rear end portion of the holder 20); and breakage of the optical fiber 14 occurs easily. Therefore, the optical fiber 14 is coated with the protective member 16 to relax the stress on the optical fiber 14. Further, a protective member such as a tube (e.g., referring to JP-A 2013-200352 (Kokai)), a boot (e.g., referring to JP-A 2016-224346 (Kokai)), etc., may be mounted at fundamental portions.

However, in the case where a protective member such as a tube, a boot, or the like is mounted, the holder 20, etc., must be set to be longer by the amount covered with the protective member; the length in the axial direction of the optical receptacle undesirably lengthens; and a larger size of the product is undesirably caused. Therefore, in the case where downsizing is necessary, the optical fiber 14 is mounted in the product interior in the state of being protected by only the protective member 16.

The protective member 16 is fixedly bonded to the holder 20 by the elastic member 24. Generally, the hardness of the protective member 16 is lower than the hardness of the elastic member 24. Therefore, when the optical fiber 14 is bent in handling, etc., the stress generated at the boundary between the protective member 16 and the elastic member 24 is high; in the worst case, there is a possibility that the protective member 16 may be damaged; and the protection function of the optical fiber 14 may undesirably decrease.

Conversely, by providing the elastic member 302 in the optical receptacle 300 according to the embodiment, the starting point of the bending when the optical fiber 14 is bent in handling, etc., can be distal to the elastic member 24. In such a case, by setting the hardness of the elastic member 302 to be lower than the hardness of the elastic member 24, the stress that is applied to the protective member 16 at the boundary with the elastic member 302 can be suppressed even when the optical fiber 14 is bent in handling, etc. Thereby, the damage of the protective member 16 at the boundary vicinity with the elastic member 24 and/or the elastic member 302, etc., can be suppressed; and the risk of breakage of the optical fiber 14 can be reduced further. Also, the larger size of the product also can be suppressed compared to the case where a protective member such as a tube, a boot, or the like is provided.

Also, in the optical receptacle 300, the width W2 of the elastic member 302 at the first rear end surface BS1 of the holder 20 is wider than the width W1 of the elastic member 24 at the first rear end surface BS1 of the holder 20. Thereby, the wall thickness of the elastic member 302 can be ensured appropriately regardless of the final quality of the width W1 of the elastic member 24 at the rear end surface of the holder 20; and the damage of the elastic member 302 itself, etc., can be suppressed even when the optical fiber 14 is bent by stress from the outside, etc.

In the optical receptacle 300, the width W2 of the elastic member 302 in the direction orthogonal to the axial direction is narrower than the width Wbs of the first rear end surface BS1 in the direction orthogonal to the axial direction. Thereby, the flow of the elastic member 302 to the second rear end surface BS2 can be suppressed; and the appropriate positional alignment when assembling is possible.

In the optical receptacle 300, the length L2 in the axial direction of the elastic member 302 is longer than the length L1 in the axial direction of the protrusion 24p. Thereby, the wall thickness of the elastic member 302 can be ensured appropriately regardless of the final quality of the length in the axial direction of the protrusion 24p; and the damage of the elastic member 302 itself, etc., can be suppressed even when the optical fiber 14 is bent by stress from the outside, etc.

The length L2 of the elastic member 302 is, for example, not less than 2 times the length L1 of the protrusion 24p. Thereby, the damage of the elastic member 302 itself, etc., can be suppressed more appropriately. Also, the length L2 of the elastic member 302 is, for example, not more than 4 times the length L1 of the protrusion 24p. Thereby, the larger size of the product can be suppressed appropriately.

In the optical receptacle 300, the average tilt angle θ2 between the outer surface of the elastic member 302 and the first rear end surface BS1 of the holder 20 is not less than the average tilt angle θ1 between the outer surface of the protrusion 24p and the first rear end surface BS1 of the holder 20. Thereby, the wall thickness of the elastic member 302 can be ensured appropriately regardless of the final quality of the width of the elastic member 24 at the first rear end surface BS1 of the holder 20; and the damage of the elastic member 302 itself, etc., can be suppressed even when the optical fiber 14 is bent by stress from the outside, etc.

Figure 13A:
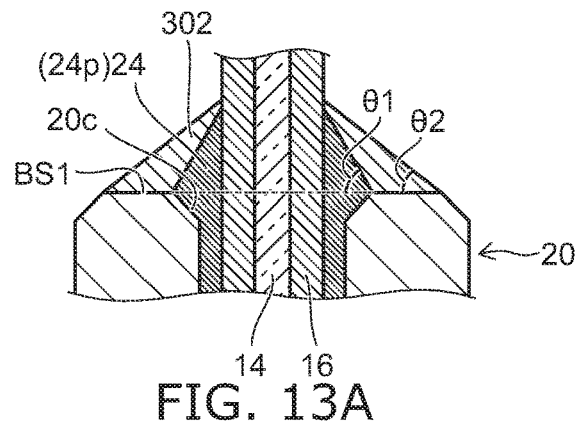
FIG. 13A to FIG. 13C are partial cross-sectional views illustrating modifications of the pigtail-type optical receptacle according to the fourth embodiment.
Figure 13B:
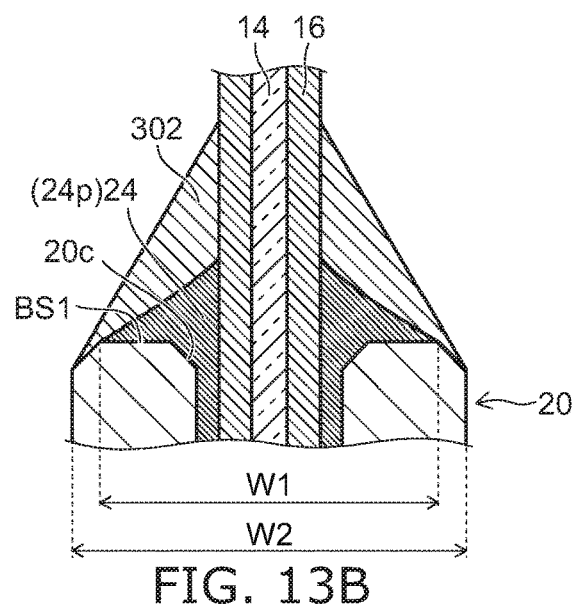
Figure 13C:
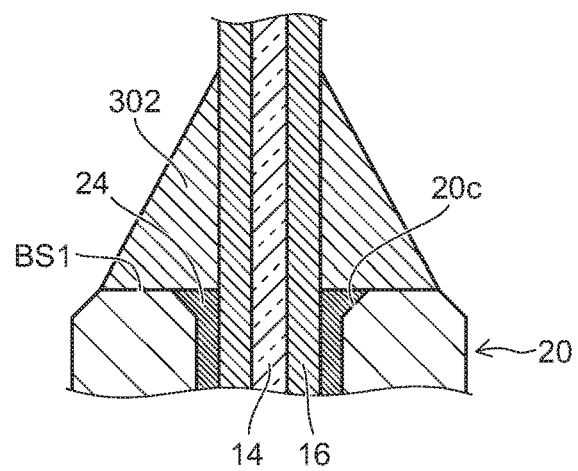

FIG. 13A to FIG. 13C are partial cross-sectional views illustrating modifications of the pigtail-type optical receptacle according to the fourth embodiment.

As illustrated in FIG. 13A, the average tilt angle θ2 between the outer surface of the elastic member 302 and the first rear end surface BS1 may be smaller than the average tilt angle θ1 between the outer surface of the protrusion 24p and the first rear end surface BS1.

However, in such a case, the wall thickness of the elastic member 302 undesirably becomes thin partially. For example, the wall thickness of the elastic member 302 undesirably becomes thin at the portion on the rear end side covering the boundary portion between the elastic member 24 and the protective member 16. Therefore, the risk of the damage of the elastic member 302 itself undesirably increases when the optical fiber 14 is bent by stress from the outside, etc. Accordingly, it is favorable for the tilt angle θ2 to be the tilt angle θ1 or more. Thereby, as described above, the wall thickness of the elastic member 302 can be ensured appropriately; and the damage of the elastic member 302 itself, etc., can be suppressed.

As illustrated in FIG. 13B, the width W1 of the elastic member 24 may be wider than the width of the chamfer portion 20c of the holder 20 in the direction orthogonal to the axial direction. The elastic member 24 may spread outward from the chamfer portion 20c.

However, in such a case, for example, the difference between the width W1 of the elastic member 24 and the width W2 of the elastic member 302 becomes small; and it is undesirably difficult to form the elastic member 302. Also, the wall thickness of the elastic member 302 at the vicinity of the first rear end surface BS1 becomes thin; and the risk of the damage of the elastic member 302 itself undesirably increases. Accordingly, it is favorable for the width W1 of the elastic member 24 to be not more than the width of the chamfer portion 20c of the holder 20 in the direction orthogonal to the axial direction. Thereby, for example, the elastic member 302 can be formed easily. The wall thickness of the elastic member 302 can be ensured appropriately; and the damage of the elastic member 302 itself, etc., also can be suppressed.

As illustrated in FIG. 13C, the elastic member 24 may not include the protrusion 24p. Even in such a case, by providing the elastic member 302, the damage of the protective member 16 at the boundary vicinity with the elastic member 24 and/or the elastic member 302, etc., can be suppressed while suppressing the larger size of the product; and the risk of breakage of the optical fiber 14 can be reduced further.

This embodiment includes the following aspects.

[Aspect 1]

A pigtail-type optical receptacle, comprising:

a ferrule having a tubular configuration and having a through-hole extending in an axial direction;

an optical fiber held by the ferrule in a state of being inserted into the through-hole, the optical fiber extending outside the ferrule from a rear end side of the ferrule;

a protective member covering a portion of the optical fiber extending outside the ferrule;

a sleeve having a tubular configuration, engaging an outer surface of the ferrule, and being mounted on a front end side of the ferrule;

a holder having a tubular configuration, engaging the outer surface of the ferrule, and holding the rear end side of the ferrule; and a housing having a tubular configuration, engaging an outer surface of the holder, and covering the ferrule and at least a portion of the sleeve, the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule, the holder holding a portion of the outer surface of the ferrule rearward of the first region.

[Aspect 2]

The receptacle according to aspect 1, wherein a change of the width in the orthogonal direction of the through-hole in the second region has a curved configuration, the curved configuration being convex toward a central axis side of the through-hole.

[Aspect 3]

The receptacle according to aspect 2, wherein the through-hole of the ferrule further includes a third region disposed rearward of the second region, and a change of the width in the orthogonal direction of the through-hole in the third region has a linear configuration.

[Aspect 4]

The receptacle according to aspect 1, wherein a front end of the protective member is positioned inside the second region of the through-hole.

[Aspect 5]

The receptacle according to aspect 3, wherein a front end of the protective member is positioned inside the third region of the through-hole.

[Aspect 6]

The receptacle according to aspect 1, wherein the holder holds the rear end side of the ferrule by press-fitting.

[Aspect 7]

The receptacle according to aspect 1, wherein a rear end of the holder is positioned rearward of the rear end of the ferrule, the holder surrounds a portion of the optical fiber and a portion of the protective member, and the optical fiber and the protective member further extend outside the holder and are fixedly bonded to the holder by an elastic member filled into the through-hole and into the holder.

[Aspect 8]

The receptacle according to aspect 7, wherein an inner perimeter surface of the holder includes:

a first inner perimeter portion engaging the outer surface of the ferrule; and a second inner perimeter portion positioned rearward of the first inner perimeter portion, the second inner perimeter portion protruding inward from the first inner perimeter portion and surrounding a portion of the optical fiber and a portion of the protective member, a gap is provided in the axial direction between the second inner perimeter portion and the rear end of the ferrule, and
the elastic member is filled also into the gap.

[Aspect 9]

The receptacle according to aspect 1, wherein the holder has a first rear end surface and a second rear end surface, and
the second rear end surface is recessed frontward of the first rear end surface on an outer perimeter side of the first rear end surface.

[Aspect 10]

The receptacle according to aspect 1, wherein
the outer surface of the holder includes:
a first outer perimeter portion held by the housing; and
a second outer perimeter portion provided at a front end portion of the holder, the second outer perimeter portion being recessed inward from the first outer perimeter portion.

[Aspect 11]

The receptacle according to aspect 1, wherein the holder includes a chamfer portion between a rear end surface and an inner perimeter surface.

[Aspect 12]

The receptacle according to aspect 7, wherein the elastic member includes a protrusion protruding outside the holder on the rear end side of the holder and covering a corner portion between the rear end of the holder and an outer surface of the protective member.

[Aspect 13]

The receptacle according to aspect 1, wherein the housing holds the holder by press-fitting.

[Aspect 14]

The receptacle according to aspect 1, wherein
the outer surface of the ferrule includes a first contact portion contacting an inner perimeter surface of the holder,
the outer surface of the holder includes a second contact portion contacting an inner perimeter surface of the housing, and
an intermediate point in the axial direction of the second contact portion is positioned rearward of an intermediate point in the axial direction of the first contact portion.

[Aspect 15]

A pigtail-type optical receptacle, comprising:
a ferrule having a tubular configuration and having a through-hole extending in an axial direction;
an optical fiber held by the ferrule in a state of being inserted into the through-hole, the optical fiber extending outside the ferrule from a rear end side of the ferrule;
a protective member covering a portion of the optical fiber extending outside the ferrule;
a sleeve having a tubular configuration, engaging an outer surface of the ferrule, and being mounted on a front end side of the ferrule;
a holder having a tubular configuration, engaging the outer surface of the ferrule, and holding the rear end side of the ferrule; and
a housing having a tubular configuration, engaging an outer surface of the holder, and covering the ferrule and at least a portion of the sleeve,
the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule, the width in the orthogonal direction of the through-hole in the second region changing in a curved configuration having a proportion of the change increasing toward the rear end side.

[Aspect 16]

A pigtail-type optical receptacle, comprising:
a ferrule having a tubular configuration and having a through-hole extending in an axial direction;
an optical fiber held by the ferrule in a state of being inserted into the through-hole, the optical fiber extending outside the ferrule from a rear end side of the ferrule;
a protective member covering a portion of the optical fiber extending outside the ferrule;
a sleeve having a tubular configuration, engaging an outer surface of the ferrule, and being mounted on a front end side of the ferrule;
a holder having a tubular configuration, engaging the outer surface of the ferrule, and holding the rear end side of the ferrule; and
a housing having a tubular configuration, engaging an outer surface of the holder, and covering the ferrule and at least a portion of the sleeve,
the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule,
the housing engaging the outer surface of the holder rearward of the first region.

[Aspect 17]

The receptacle according to aspect 16, wherein
the outer surface of the holder includes:
a first outer perimeter portion held by the housing; and
a second outer perimeter portion provided at a front end portion of the holder, the second outer perimeter portion being recessed inward from the first outer perimeter portion, and
the first outer perimeter portion is positioned rearward of the first region.

[Aspect 18]

The receptacle according to aspect 16, wherein
an inner surface of the housing includes:
a first inner perimeter portion engaging the outer surface of the holder; and
a second inner perimeter portion provided frontward of the first inner perimeter portion, the second inner perimeter portion widening outward from the first inner perimeter portion, and
the first inner perimeter portion is positioned rearward of the first region.

[Aspect 19]

The receptacle according to aspect 18, wherein the second inner perimeter portion is connected to the first inner perimeter portion via a tilted surface or a curved surface.

[Aspect 20]

A pigtail-type optical receptacle, comprising:
a ferrule having a tubular configuration and having a through-hole extending in an axial direction;
an optical fiber held by the ferrule in a state of being inserted into the through-hole, the optical fiber extending outside the ferrule from a rear end side of the ferrule;
a protective member covering a portion of the optical fiber extending outside the ferrule;

a sleeve having a tubular configuration, engaging an outer surface of the ferrule, and being mounted on a front end side of the ferrule;

a holder having a tubular configuration, engaging the outer surface of the ferrule, and holding the rear end side of the ferrule; and a housing having a tubular configuration, being mounted to the holder, and covering the ferrule and at least a portion of the sleeve, the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule, the holder including a flange protruding outward from the housing, the flange being provided frontward of the second region, the housing being mounted to the holder frontward of the flange.

[Aspect 21]

A pigtail-type optical receptacle, comprising:

a ferrule having a tubular configuration and having a through-hole extending in an axial direction;

an optical fiber held by the ferrule in a state of being inserted into the through-hole, the optical fiber extending outside the ferrule from a rear end side of the ferrule;

a protective member covering a portion of the optical fiber extending outside the ferrule;

a sleeve having a tubular configuration, engaging an outer surface of the ferrule, and being mounted on a front end side of the ferrule;

a holder having a tubular configuration, engaging the outer surface of the ferrule, and holding the rear end side of the ferrule;

a housing having a tubular configuration, engaging an outer surface of the holder, and covering the ferrule and at least a portion of the sleeve;

a first elastic member filled into the through-hole and into the holder; and a second elastic member covering a corner portion between a rear end of the holder and the outer surface of the protective member, the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule, the holder holding a portion of the outer surface of the ferrule rearward of the first region, the rear end of the holder being positioned rearward of the rear end of the ferrule, the holder surrounding a portion of the optical fiber and a portion of the protective member, the optical fiber and the protective member further extending outside the holder and being fixedly bonded to the holder by the first elastic member, a hardness of the second elastic member being lower than a hardness of the first elastic member.

[Aspect 22]

A pigtail-type optical receptacle, comprising:

a ferrule having a tubular configuration and having a through-hole extending in an axial direction;

an optical fiber held by the ferrule in a state of being inserted into the through-hole, the optical fiber extending outside the ferrule from a rear end side of the ferrule;

a protective member covering a portion of the optical fiber extending outside the ferrule;

a sleeve having a tubular configuration, engaging an outer surface of the ferrule, and being mounted on a front end side of the ferrule;

a holder having a tubular configuration, engaging the outer surface of the ferrule, and holding the rear end side of the ferrule;

a housing having a tubular configuration, engaging an outer surface of the holder, and covering the ferrule and at least a portion of the sleeve;

a first elastic member filled into the through-hole and into the holder; and a second elastic member covering a corner portion between a rear end of the holder and the outer surface of the protective member, the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule, the width in the orthogonal direction of the through-hole in the second region changing in a curved configuration having a proportion of the change increasing toward the rear end side, the rear end of the holder being positioned rearward of the rear end of the ferrule, the holder surrounding a portion of the optical fiber and a portion of the protective member, the optical fiber and the protective member further extending outside the holder and being fixedly bonded to the holder by the first elastic member, a hardness of the second elastic member being lower than a hardness of the first elastic member.

[Aspect 23]

A pigtail-type optical receptacle, comprising:

a ferrule having a tubular configuration and having a through-hole extending in an axial direction;

an optical fiber held by the ferrule in a state of being inserted into the through-hole, the optical fiber extending outside the ferrule from a rear end side of the ferrule;

a protective member covering a portion of the optical fiber extending outside the ferrule;

a sleeve having a tubular configuration, engaging an outer surface of the ferrule, and being mounted on a front end side of the ferrule;

a holder having a tubular configuration, engaging the outer surface of the ferrule, and holding the rear end side of the ferrule;

a housing having a tubular configuration, engaging an outer surface of the holder, and covering the ferrule and at least a portion of the sleeve;

a first elastic member filled into the through-hole and into the holder; and a second elastic member covering a corner portion between a rear end of the holder and an outer surface of the protective member, the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule;

the housing engaging the outer surface of the holder rearward of the first region, the rear end of the holder being positioned rearward of the rear end of the ferrule, the holder surrounding a portion of the optical fiber and a portion of the protective member, the optical fiber and the protective member further extending outside the holder and being fixedly bonded to the holder by the first elastic member, a hardness of the second elastic member being lower than a hardness of the first elastic member.

[Aspect 24]

A pigtail-type optical receptacle, comprising:

a ferrule having a tubular configuration and having a through-hole extending in an axial direction;

an optical fiber held by the ferrule in a state of being inserted into the through-hole, the optical fiber extending outside the ferrule from a rear end side of the ferrule;

a protective member covering a portion of the optical fiber extending outside the ferrule;

a sleeve having a tubular configuration, engaging an outer surface of the ferrule, and being mounted on a front end side of the ferrule;

a holder having a tubular configuration, engaging the outer surface of the ferrule, and holding the rear end side of the ferrule;

a housing having a tubular configuration, being mounted to the holder, and covering the ferrule and at least a portion of the sleeve;

a first elastic member filled into the through-hole and into the holder; and a second elastic member covering a corner portion between a rear end of the holder and an outer surface of the protective member, the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule, the holder including a flange protruding outward from the housing, the flange being provided frontward of the second region, the housing being mounted to the holder frontward of the flange, the rear end of the holder being positioned rearward of the rear end of the ferrule, the holder surrounding a portion of the optical fiber and a portion of the protective member, the optical fiber and the protective member further extending outside the holder and being fixedly bonded to the holder by the first elastic member, a hardness of the second elastic member being lower than a hardness of the first elastic member.

[Aspect 25]

The receptacle according to aspect 21, wherein a width of the second elastic member at a rear end surface of the holder is wider than a width of the first elastic member at the rear end surface of the holder.

[Aspect 26]

26. The receptacle according to aspect 21, wherein the holder has a first rear end surface and a second rear end surface, the second rear end surface is recessed frontward of the first rear end surface on an outer perimeter side of the first rear end surface, and a width in a direction orthogonal to the axial direction of the second elastic member is narrower than a width in the direction orthogonal to the axial direction of the first rear end surface.

[Aspect 27]

The receptacle according to aspect 21, wherein the first elastic member includes a protrusion protruding outside the holder on the rear end side of the holder, the protrusion covers a corner portion between the rear end of the holder and the outer surface of the protective member, and the second elastic member covers the protrusion.

[Aspect 28]

The receptacle according to aspect 27, wherein a length in the axial direction of the second elastic member is longer than a length in the axial direction of the protrusion.

[Aspect 29]

The receptacle according to aspect 27, wherein an average tilt angle between an outer surface of the second elastic member and a rear end surface of the holder is not less than an average tilt angle between an outer surface of the protrusion and the rear end surface of the holder.

Embodiments of the invention are described hereinabove. However, the invention is not limited to these descriptions. Appropriate design modifications performed by one skilled in the art based on the embodiments described above also are within the scope of the invention to the extent that the features of the invention are included. For example, the configuration, the dimensions, the material properties, the arrangement, etc., of each component included in the optical receptacles 10, 10a, 10b, 100, 100a, 200, 200a, 200b, 300, etc., are not limited to those illustrated and can be modified appropriately.

Also, the components included in the embodiments described above can be combined within the limits of technical feasibility; and such combinations are within the scope of the invention to the extent that the features of the invention are included.

What is claimed is:

1. A pigtail-type optical receptacle, comprising:
a ferrule having a tubular configuration and having a through-hole extending in an axial direction;
an optical fiber held by the ferrule in a state of being inserted into the through-hole, the optical fiber extending outside the ferrule from a rear end side of the ferrule;
a protective member covering a portion of the optical fiber extending outside the ferrule;
a sleeve having a tubular configuration, engaging an outer surface of the ferrule, and being mounted on a front end side of the ferrule;
a holder having a tubular configuration, engaging the outer surface of the ferrule, and holding the rear end side of the ferrule; and a housing having a tubular configuration, engaging an outer surface of the holder, and covering whole of the ferrule and at least a portion of the sleeve around the axial direction, the through-hole of the ferrule including a first region and a second region, a width in an orthogonal direction of the through-hole in the first region corresponding to a width in the orthogonal direction of the optical fiber, the orthogonal direction being orthogonal to the axial direction, the second region being disposed rearward of the first region, the width in the orthogonal direction of the through-hole in the second region widening toward the rear end side of the ferrule, the holder holding only at least a portion of an outer surface of the second region rearward of the first region among the outer surface of the ferrule.

2. The receptacle according to claim 1, wherein a change of the width in the orthogonal direction of the through-hole in the second region has a curved configuration, the curved configuration being convex toward a central axis side of the through-hole.

3. The receptacle according to claim 2, wherein the through-hole of the ferrule further includes a third region disposed rearward of the second region, and a change of the width in the orthogonal direction of the through-hole in the third region has a linear configuration.

4. The receptacle according to claim 1, wherein a front end of the protective member is positioned inside the second region of the through-hole.

5. The receptacle according to claim 3, wherein a front end of the protective member is positioned inside the third region of the through-hole.

6. The receptacle according to claim 1, wherein the holder holds the rear end side of the ferrule by press-fitting.

7. The receptacle according to claim 1, wherein a rear end of the holder is positioned rearward of the rear end of the ferrule, the holder surrounds a portion of the optical fiber and a portion of the protective member, and the optical fiber and the protective member further extend outside the holder and are fixedly bonded to the holder by an elastic member filled into the through-hole and into the holder.

8. The receptacle according to claim 7, wherein an inner perimeter surface of the holder includes: a first inner perimeter portion engaging the outer surface of the ferrule; and a second inner perimeter portion positioned rearward of the first inner perimeter portion, the second inner perimeter portion protruding inward from the first inner perimeter portion and surrounding a portion of the optical fiber and a portion of the protective member, a gap is provided in the axial direction between the second inner perimeter portion and the rear end of the ferrule, and the elastic member is filled also into the gap.

9. The receptacle according to claim 1, wherein the holder has a first rear end surface and a second rear end surface, and the second rear end surface is recessed frontward of the first rear end surface on an outer perimeter side of the first rear end surface.

10. The receptacle according to claim 1, wherein the outer surface of the holder includes: a first outer perimeter portion held by the housing; and a second outer perimeter portion provided at a front end portion of the holder, the second outer perimeter portion being recessed inward from the first outer perimeter portion.

11. The receptacle according to claim 1, wherein the holder includes a chamfer portion between a rear end surface and an inner perimeter surface.

12. The receptacle according to claim 7, wherein the elastic member includes a protrusion protruding outside the holder on the rear end side of the holder and covering a corner portion between the rear end of the holder and an outer surface of the protective member.

13. The receptacle according to claim 1, wherein the housing holds the holder by press-fitting.

14. The receptacle according to claim 1, wherein the outer surface of the ferrule includes a first contact portion contacting an inner perimeter surface of the holder, the outer surface of the holder includes a second contact portion contacting an inner perimeter surface of the housing, and an intermediate point in the axial direction of the second contact portion is positioned rearward of an intermediate point in the axial direction of the first contact portion.

* * * * *